United States Patent
Yamada et al.

(10) Patent No.: US 7,643,178 B2
(45) Date of Patent: Jan. 5, 2010

(54) IMAGE PROCESSING METHOD AND APPARATUS

(75) Inventors: Akitoshi Yamada, Kanagawa (JP); Kentaro Yano, Kanagawa (JP); Masao Kato, Kanagawa (JP); Fumitaka Goto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 11/839,021

(22) Filed: Aug. 15, 2007

(65) Prior Publication Data

US 2008/0018939 A1    Jan. 24, 2008

Related U.S. Application Data

(62) Division of application No. 10/368,592, filed on Feb. 20, 2003, now Pat. No. 7,274,491.

(30) Foreign Application Priority Data

Feb. 22, 2002  (JP) .............................. 2002/046688

(51) Int. Cl.
*H04N 1/40* (2006.01)
(52) U.S. Cl. ..................... 358/3.06; 358/518; 382/237
(58) Field of Classification Search ....... 358/3.06–3.09, 358/1.9, 2.1, 518; 382/237, 260–269
See application file for complete search history.

(56) References Cited

U.S. PATENT DOCUMENTS 6,172,770 B1    1/2001    Inoue .................. 358/3.06
2003/0174351 A1    9/2003    Kawanabe et al. ........... 358/1.9

FOREIGN PATENT DOCUMENTS

| JP | 10-23261 | 1/1998 |
| JP | 11-346372 | 12/1999 |
| JP | 2000-013625 A | 1/2000 |
| JP | 3163753 B2 | 3/2001 |

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

Upon outputting halftone image data to an output device, density transformation is prevalently performed to improve image quality. Density transformation corresponds to linear gamma correction, and cannot correct for color fog and the like that may occur in a photo image. Hence, lightness and color-difference information of halftone image data is acquired on the basis of low-frequency components of frequency data obtained by transforming halftone image data into spatial frequency components, and a lightness and color-difference transform amount of the halftone image data is set on the basis of the acquired lightness and color-difference information.

5 Claims, 19 Drawing Sheets

F I G. 15
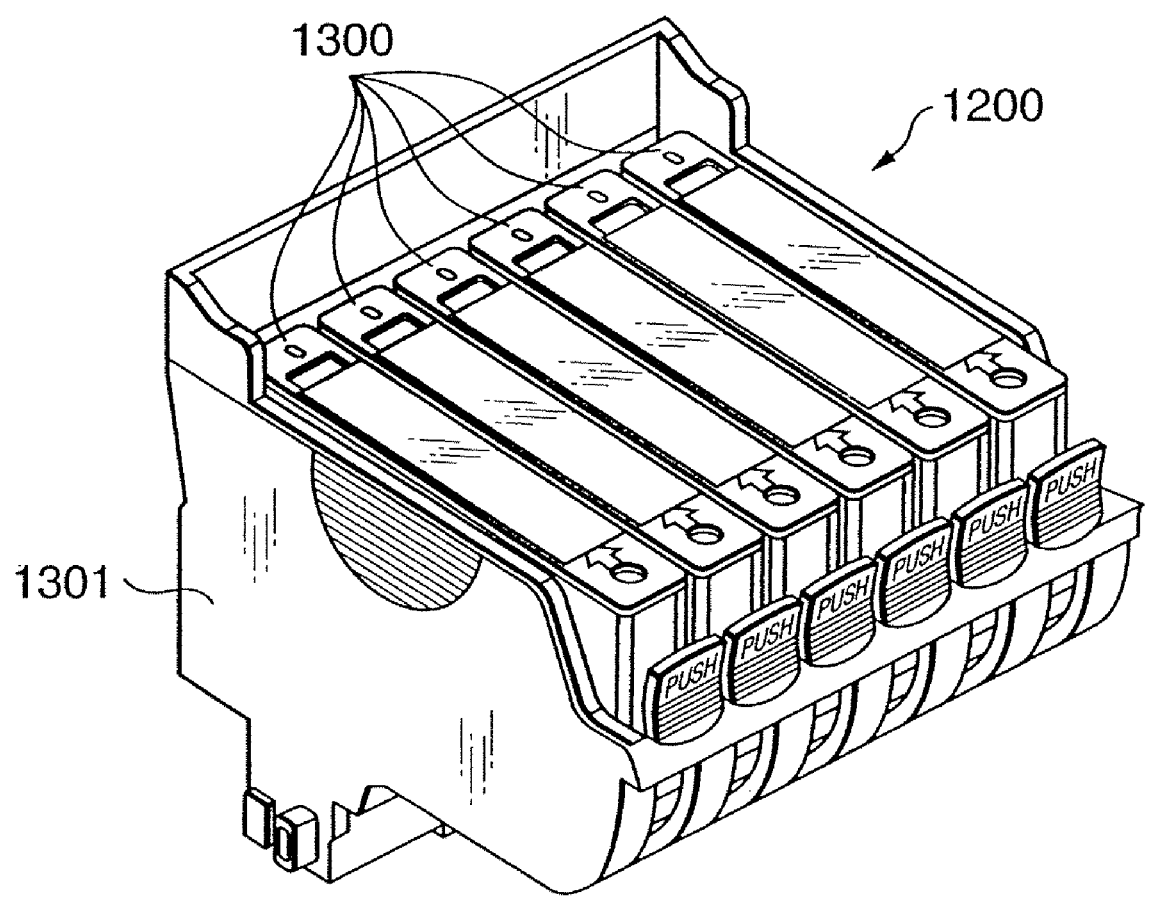

IMAGE PROCESSING METHOD AND APPARATUS

RELATED APPLICATIONS

This application is a divisional of Ser. No. 10/368,592, filed Feb. 20, 2003 now U.S. Pat. No. 7,274,491 and claims priority benefit under 35 U.S.C. §119 of Japanese Patent Application 2002/046688, filed Feb. 22, 2002. The entire disclosure of both mentioned prior applications is incorporated herein by reference.

FIELD OF THE INVENTION

The present invention relates to an image processing apparatus and method and, more particularly, to an image process for acquiring lightness information and color difference information of grayscale image data which is transformed into frequency data by, e.g., discrete cosine transformation, and setting lightness and color-difference transformation amounts of the grayscale image data.

BACKGROUND OF THE INVENTION

Upon outputting grayscale image data to an output device, density transformation is popularly done to improve image quality. For example, JP 3,163,753 (B2) discloses a technique for quickly inspecting the density distribution by inspecting that of low-frequency components in frequency data obtained by transforming grayscale image data into spatial frequency components, and transforming the density on the basis of the inspection result.

According to the above technique, the density of an image can be transformed. However, density transformation corresponds to linear gamma correction, and cannot correct color fog and the like of a photo image.

A photo-direct printer as a non-PC device normally has a RAM size of several Mbytes in terms of cost limitations and the like, and its storage capacity is as small as around 1/16 to 1/64 of those of recent PCs. The photo-direct printer must often store a program, and data associated with control of the printer and interface in a single RAM, thus imposing severer memory limitations. In recent years, since the number of pixels of a digital camera increases, the data size per photo increases, and some data exceed 1 MB per photo.

In consideration of the above circumstances, when a work memory has an insufficient storage capacity, access to an external storage device (e.g., a memory card) occurs frequently, resulting in a considerable drop of the processing speed.

SUMMARY OF THE INVENTION

The present invention has been made to solve the aforementioned problems individually or simultaneously, and has as its object to quickly set lightness and color difference transformation amounts used to correct color fog, contrast, saturation, and the like of an image.

In order to achieve the above object, a preferred embodiment of the present invention is an image processing apparatus comprising: an obtaining section, arranged to acquire lightness and color-difference information of halftone image data on the basis of low-frequency components of frequency data obtained by transforming the halftone image data into spatial frequency components; and a setter, arranged to set a lightness and color-difference transform amount of the halftone image data on the basis of the acquired lightness and color-difference information.

It is another object of the present invention to set quickly and accurately lightness and color difference transformation amounts used to correct color fog, contrast, saturation, and the like of an image.

In order to achieve the above object, a preferred embodiment of the present invention is an image processing apparatus comprising: an extractor, arranged to extract a feature amount of frequency data obtained by transforming halftone image data into spatial frequency components; a determiner, arranged to determine an acquisition method of lightness and color-difference information of the halftone image data on the basis of the extracted feature amount; an obtaining section, arranged to acquire lightness and color-difference information of the halftone image data from the frequency data in accordance with the determination result; and a setter, arranged to set a lightness and color-difference transform amount of the halftone image data on the basis of the acquired lightness and color-difference information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a schematic perspective view showing an example of the structure of a print head;

DESCRIPTION OF THE PREFERRED EMBODIMENTS

An image process according to preferred embodiments of the present invention will be described in detail hereinafter with reference to the accompanying drawings.

[Coding Principle of Image Data]

The coding principle of image data based on orthogonal transformation will be briefly explained first.

Transformation coding based on orthogonal transformation removes correlation among sample values by transforming sample values into coordinate system values which are orthogonal to each other, thus implementing efficient coding. Image data is transformed into frequency components, and quantization is done by assigning many code bits to low-frequency components where power is concentrated and the influence is large in terms of visual characteristics, and assigning fewer code bits to high-frequency components, thus improving the compression ratio of data. As orthogonal transformation for transforming image data into frequency components, Hadamard transformation, discrete cosine transformation (DCT), and the like are known.

Figure 1:
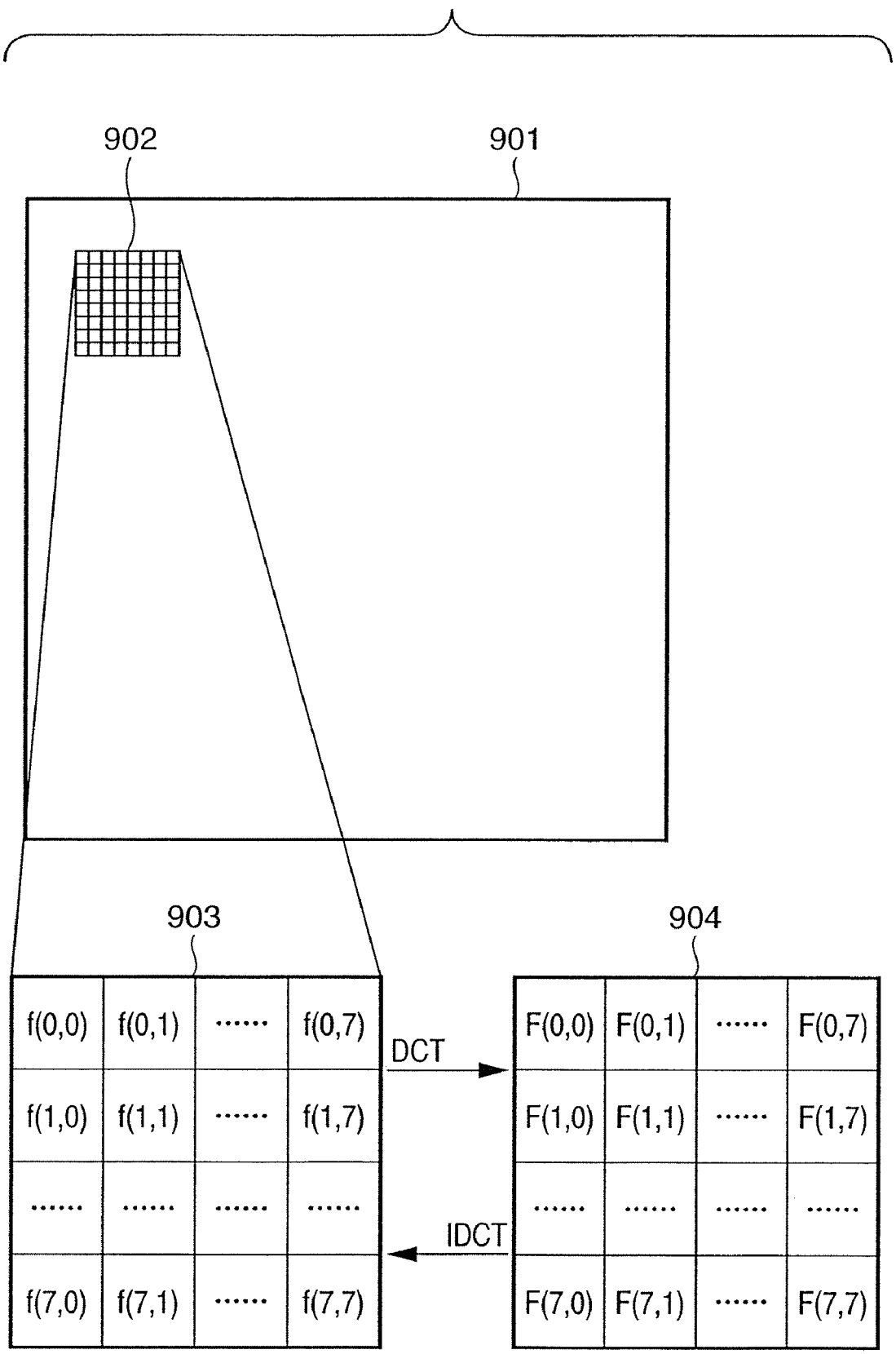
FIG. 1 is a view for explaining DCT and IDCT.

DCT and its inverse transformation (to be referred to as "IDCT" hereinafter) will be described below with reference to FIG. 1 taking as an example a case wherein coding is done to have 8×8 pixels as one block.

Original image data 901 is broken up into blocks 902 each having 8×8 pixels, and transformation is made for respective blocks. As for pixel positions depending on their relative positions in a block, an upper left pixel is defined as 0th data as the origin, and pixel data at the i-th position in the right direction and the j-th position in the down direction is defined by:

$$f(i, j)$$

for $0 \leq i < 8$, $0 \leq j < 8$ where i and j are integers.

Therefore, origin data at the upper left corner of a block 903 is f(0, 0), and data at the lower right corner is f(7, 7). Data F(u, v) (0≤u<8, 0≤v<8, of a block 904 that has undergone DCT is given by:

$$F(u,v) = \frac{1}{4} \{ c(u)c(v) \Sigma_{i=0}^{7} \Sigma_{j=0}^{7} f(i,j) \cos U \cos V \} \quad (1)$$

for $U = (2i+1)u\pi/16$ $V = (2j+1)v\pi/16$

F(0, 0) represents a value corresponding to average data of the image block 902, and is called a DC coefficient in the sense of a direct current component. In case of equation (1), F(0, 0) is an 8-fold value of the average value of intra-block data in practice. The remaining 63 elements represent alternate current components, and are also called AC coefficients. A component has a higher frequency with increasing value u or v in equation (1). Upon data compression, by exploiting the characteristics that AC components of a photo image have smaller values as increasing frequency, and high-frequency components are hard to perceive by the human eye, high-frequency components are quantized by cutting their lower bits, i.e., by a smaller number of bits.

IDCT for calculating f(i, j) from F(u, v) is given by:

$$f(i,j) = \frac{1}{4} \{ \Sigma_{u=0}^{7} \Sigma_{v=0}^{7} F(u,v)c(u)c(v) \cos U \cos V \} \quad (2)$$

for $U = (2i+1)u\pi/16$ $V = (2j+1)v\pi/16$

Note that the definitions of c(u) and c(v) in equation (2) are the same as those in equation (1).

First Embodiment

Figure 2:
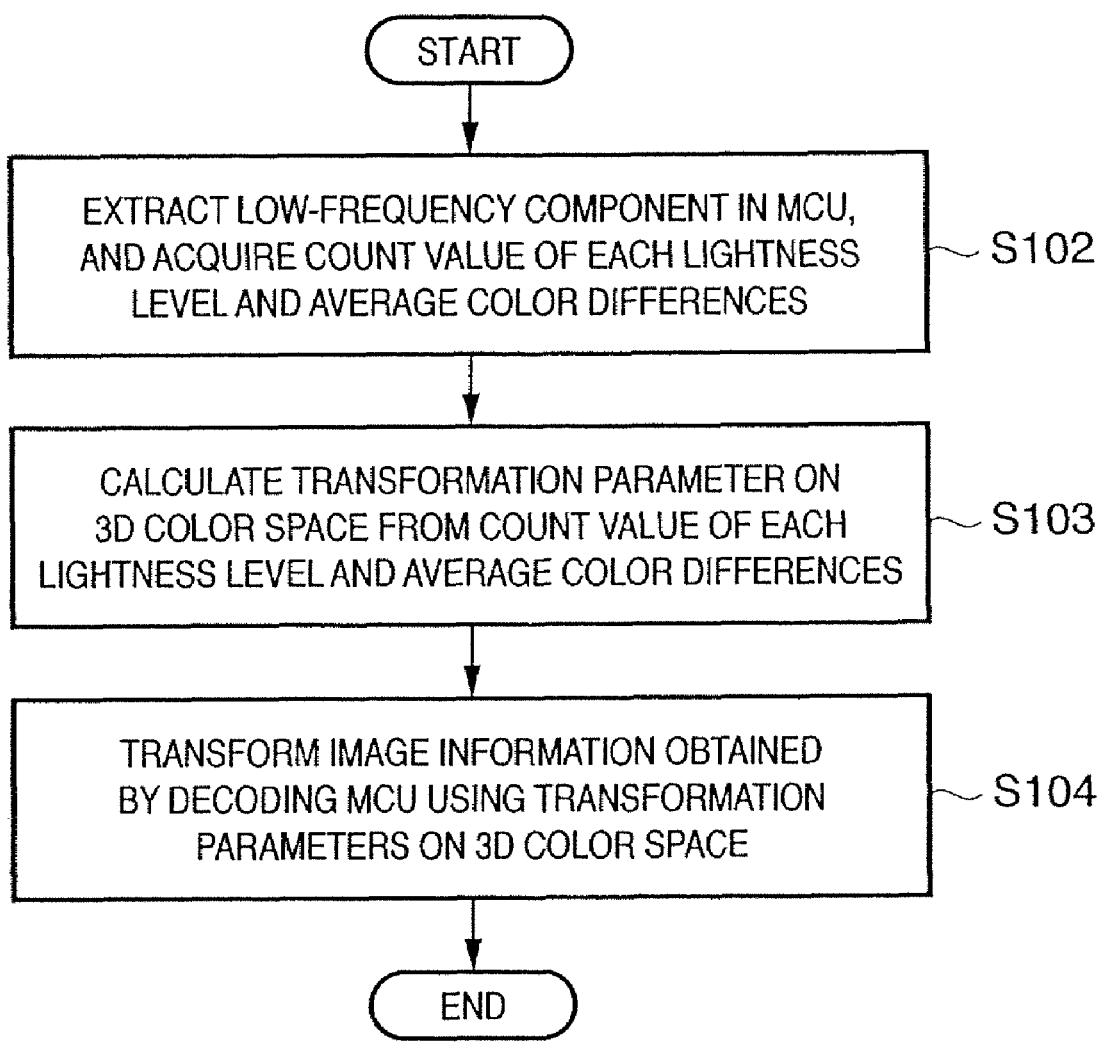
FIG. 2 is a flow chart showing the process of encoded image data.

FIG. 2 is a flow chart showing the process of image data which is encoded by DCT to have 8×8 pixels as one block. In the following description, JPEG (Joint Photographic Experts Group) is used as an image format example of an encoded image, and YCbCr is used as a colorimetric system.

In step S102, an encoded image is analyzed. DC components of lightness and color-difference signals in MCUs (Minimum Coded Units) are extracted without computing the IDCTs of all MCUs of an objective image. These lightness and color-difference signals are accumulated and counted to acquire count values and average color differences for respective lightness levels.

In step S103, transformation parameters of lightness and color-difference signals on a three-dimensional (3D) color space are calculated on the basis of the count values and average color differences for respective lightness levels.

Finally, in step S104 the IDCTs of all the MCUs of the encoded image are computed to decode original image information. Based on the transformation parameters of lightness and color-difference signals on the 3D color space acquired in step S103, the transforms of lightness and color-difference signals obtained by decoding the MCUs are computed on the 3D color space, thus obtaining an image with satisfactory lightness and color-difference signals.

The processes in steps S102 and S103 will be described in detail below.

[Accumulation/Count Process of Lightness and Color-Difference Signals]

Figure 3:
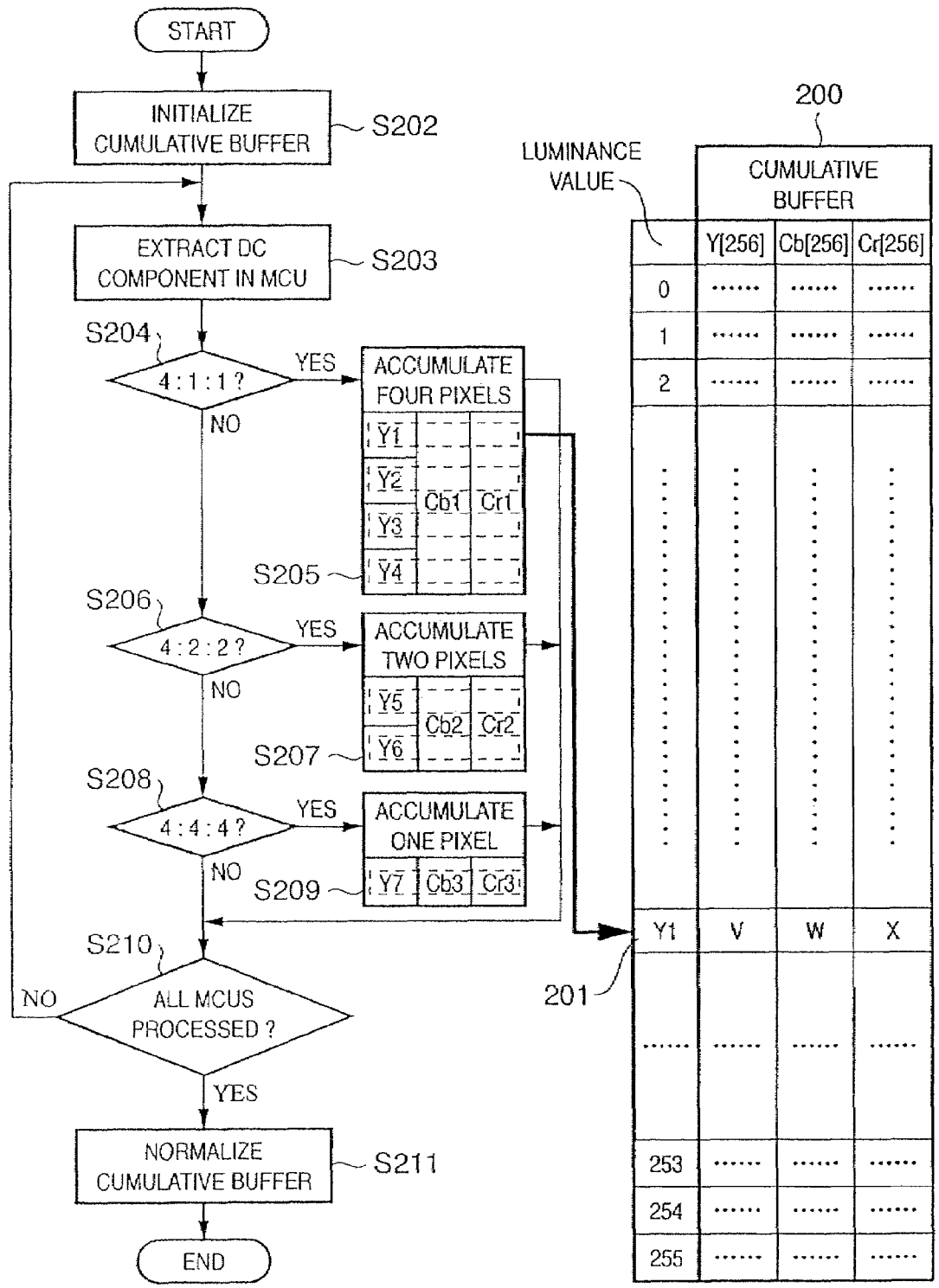
FIG. 3 is a flow chart showing the accumulation/count process of lightness and color-difference signals.

FIG. 3 is a flow chart for explaining the accumulation/count process of lightness and color-difference signals in step S102. Note that a cumulative buffer 200 shown in FIG. 3 is used to accumulate/count lightness and color-difference signals generated in the processing flow. Since lightness levels are 256 gray levels ranging from 0 to 255, the cumulative buffer 200 has lightness counters Y[256], Cb signal cumulative buffers Cb[256], and Cr signal cumulative buffers Cb[256] in correspondence with respective lightness gray levels.

In step S202, the lightness counters, and Cb and Cr signal cumulative buffers in the cumulative buffer 200 are reset to zero. In step S203, an MCU of an encoded image is checked to extract DC components of lightness Y and color differences Cb and Cr. Note that the MCU is a minimum unit of lightness and color-difference signals, and its configuration varies depending on the coding resolutions of the lightness and color-difference signals.

In JPEG, since the resolution of a lightness signal is often different from those of color difference signals, lightness and color-difference signals are accumulated and counted in accordance with their coding state in step S204, S206, or S208. It is checked in step S204 if the ratio of signal quantities of a lightness signal and color difference signals in the MCU is 4:1:1.4:1:1 indicates a case wherein one MCU consists of 16×16 pixels, four blocks each including 8×8 pixels are assigned to lightness, and one block obtained by decimating 16×16 pixels to 8×8 pixels is assigned to each of color differences Cb and Cr. In addition, such case is often described as 4:2:0 or the like.

If the signal quantity ratio is 4:1:1, since there are one each DC components (Cb1 and Cr1) of the color difference signals compared to DC components Y1, Y2, Y3, and Y4 of four lightness signals, four sets of color signals Y1Cb1Cr1, Y2Cb1Cr1, Y3Cb1Cr1, and Y4Cb1Cr1 are accumulated in the cumulative buffer 200 as color signals. FIG. 3 shows a state wherein color signals Y1Cb1Cr1 are accumulated in the cumulative buffer 200. A buffer 201 corresponding to a signal value of lightness signal Y1 is detected, values V=Y[Y1], W=Cb[Y1], and X=Cr[Y1] stored in the buffer 201 are read out, and Y[Y1]=V+1, Cb[Y1]=W+Cb1, and Cr[Y1]=X+Cr[Y1] are written in the buffer 201, thus accumulating the color signals. Likewise, three sets of color signals Y2Cb1Cr1, Y3Cb1Cr1, and Y4Cb1Cr1 are accumulated in the cumulative buffer 200, and the flow then jumps to step S210.

If the signal quantity ratio is not 4:1:1, it is checked in step S206 if the signal quantity ratio is 4:2:2.4:2:2 indicates a case wherein one MCU consists of 8×16 pixels, two blocks each consisting of 8×8 pixels are assigned to lightness, and one block obtained by decimating 8×16 pixels to 8×8 pixels is assigned to each of color differences Cb and Cr. In addition, such case is often described as 2:1:1 or the like.

If the signal quantity ratio is 4:2:2, since there are one each DC components (Cb2 and Cr2) of the color difference signals compared to DC components Y5 and Y6 of two lightness signals, two sets of color signals Y5Cb2Cr2 and Y6Cb2Cr2 are accumulated in the cumulative buffer 200 in step S207, and the flow jumps to step S210.

If the signal quantity ratio is not 4:2:2, it is checked in step S208 if the signal quantity ratio is 4:4:4.4:4:4 indicates a case wherein one MCU consists of 8×8 pixels, and one block consisting of 8×8 pixels is assigned to each of lightness Y, and color differences Cb and Cr.

If the signal quantity ratio is 4:4:4, since there are one each DC components (Cb3 and Cr3) of color difference signals compared to a DC component Y7 of a lightness signal, one set of color signals Y7Cb3Cr3 are accumulated in the cumulative buffer 200 in step S209, and the flow advances to step S210.

It is checked in step S210 if extraction of DC components of lightness/color difference signals from all the MCUs is complete. If extraction is not complete, the flow returns to step S203. However, if extraction is complete, the flow advances to step S211 to execute a normalization process of the cumulative buffer 200. In the normalization process, the values of the color difference signals cumulative buffers Cb[n] and Cr[n] are divided by the value Y[n] of the lightness information counter for each lightness gray level value n, thus calculating average color difference signals per MCU.

In the above description, the configuration of each MCU is limited to three types, i.e., 4:1:1, 4:2:2, and 4:4:4. However, if the signal quantity ratio is other than these three types, a lightness/color difference accumulation method suitable for that ratio is applied. In this embodiment, a description of such method will be omitted.

In the flow chart shown in FIG. 3, the process for determining the configuration of each MCU and the process for each configuration are executed every time DC components of each MCU are extracted. However, the position of such determination step is not particularly limited as long as lightness and color-difference signals can be suitably accumulated in accordance with the configuration.

[Color Balance Correction]

The flow then advances to step S103 to calculate transformation parameters of lightness and color-difference signals on the 3D color space on the basis of the count values of lightness levels and average color differences acquired in step S102.

A 3D image correction process of this embodiment includes color balance correction, contrast correction, and saturation correction. For these correction processes, a method described in Japanese Patent Laid-Open No. 2000-13625 can be suitably applied. This method will be briefly described below.

Highlight and shadow points are determined from an image. In this case, a cumulative frequency histogram of the lightness counters L[256] is generated. In this cumulative frequency histogram, an upper limit value of a lightness signal corresponding to a predetermined cumulative frequency Hth, which is set in advance, is determined as highlight point HL, and a lower limit value of a lightness signal corresponding to a cumulative frequency 5th is determined as shadow point SD. Then, average color differences $C1_{HL}$=Cb[HL] and $C2_{HL}$=Cr[HL] at highlight point HL, and average color differences $C1_{SD}$=Cb[SD] and $C2_{SD}$=Cr[SD] at shadow point SD are acquired.

Figure 4A:
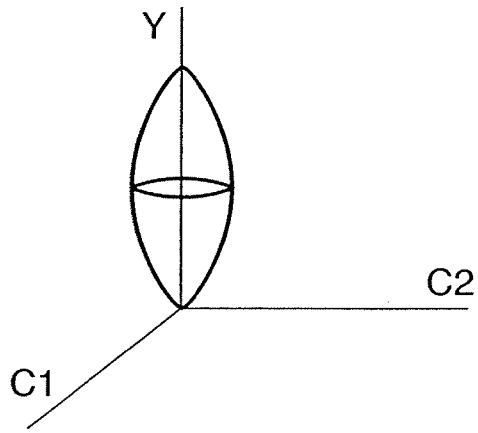
FIGS. 4A to 7B are views for explaining correction of color balance.
Figure 4B:
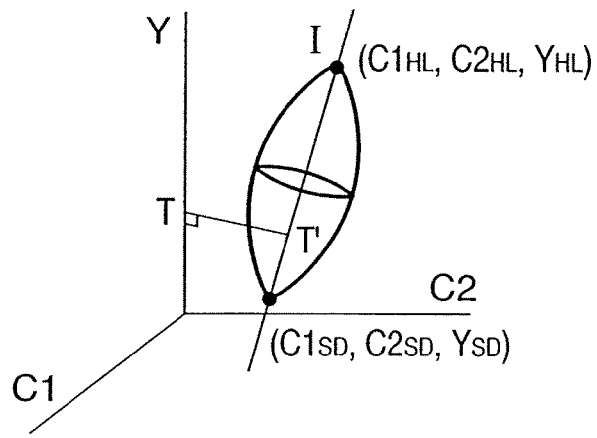

In this manner, color differences $C1_{HL}$ and $C2_{HL}$ at highlight point HL and color differences $C1_{SD}$ and $C2_{SD}$ at shadow point SD are acquired. With these color differences, color solid axis I, i.e., achromatic color axis I can be estimated, as shown in FIG. 4B. In an ideal color solid of an image with good color balance, color solid axis I agrees with lightness axis Y, as shown in FIG. 4A.

Figure 4C:
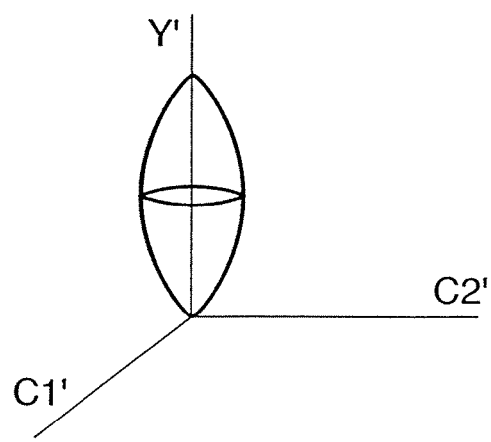

Therefore, the color balance can be corrected by calculating a rotation matrix and translation amount used to transform color solid axis I of an input image to lightness axis Y, and correcting the input image using the rotation matrix and translation amount. Note that the rotation matrix can be easily calculated as long as the axis of rotation and its angle are determined. That is, the pixel values (C1, C2, Y) of an input image shown in FIG. 4B are transformed to (C1', C2', Y') shown in FIG. 4C on the 3D color space, thereby correcting the color balance of the input image on the 3D color space.

[Adjustment of Contrast and Saturation]

Contrast and saturation are adjusted by simply checking if an input image suffers overexposure or underexposure, and gamma-correcting a lightness signal accordingly.

Note that contrast adjustment adjusts lightness at shadow point SD to "0" or its neighbor (e.g., "10") and lightness at highlight point SD to "255" or its neighbor (e.g., "245") by gamma correction according to the exposure state of the input image.

A method of simply checking if an input image suffers overexposure or underexposure and making gamma correction accordingly will be exemplified below.

Figure 5:
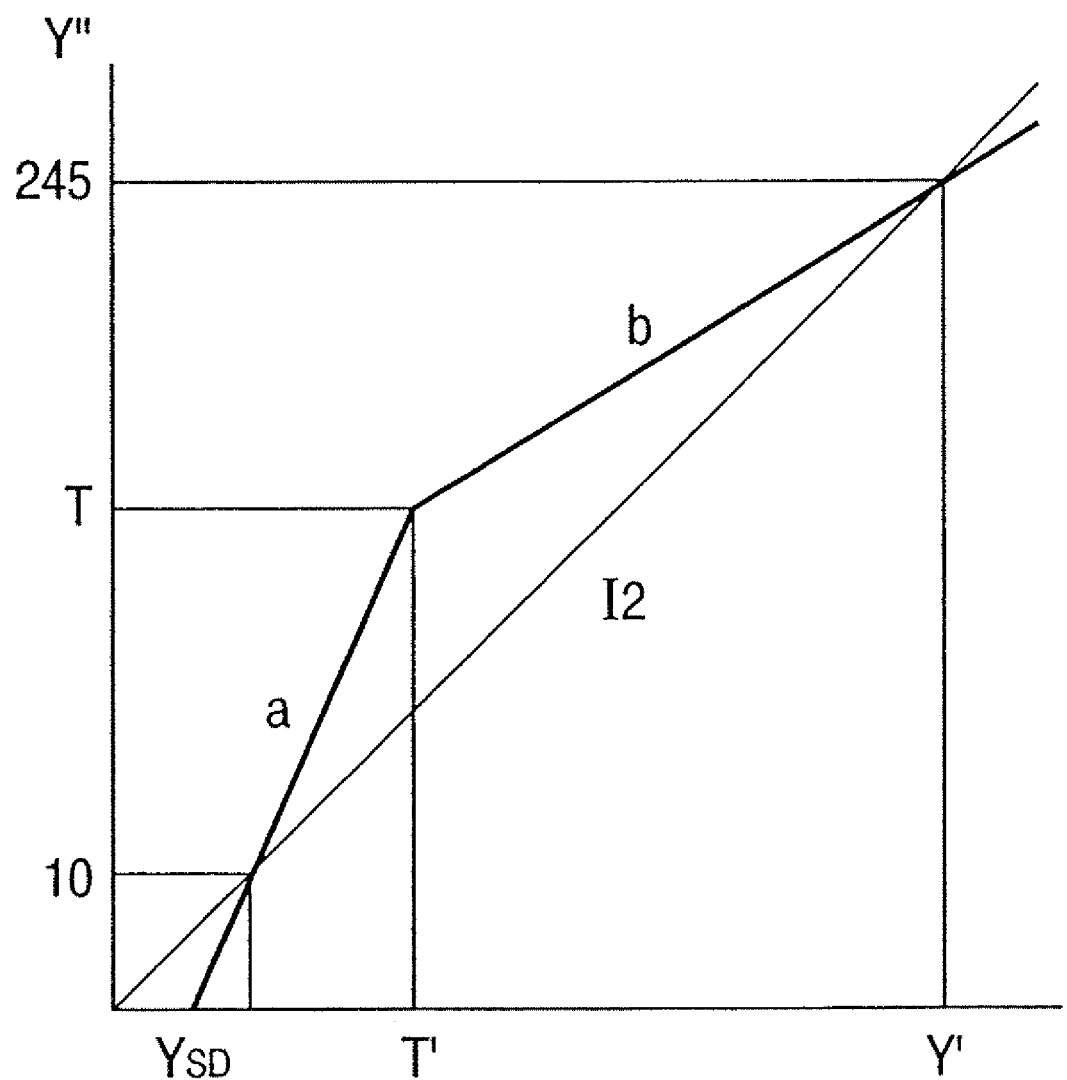

Points which indicate a minimum distance between the color solid axis of an image and the lightness axis, i.e., T and T' in FIG. 4B, are obtained. These points can be easily obtained based on a geometrical relationship. Then, contrast is adjusted so that T' becomes equal to T. That is, using (T, T') as an inflection point, lightness Y' is corrected to Y" using a function given by line a within a range Y'<T, or using a function given by line b within a range Y'>T', as shown in FIG. 5. When the color solid axis of an input image is parallel to the lightness axis, calculation itself of T is nonsense, and such specific case can be corrected using a function given by line 12.

Figure 6A:
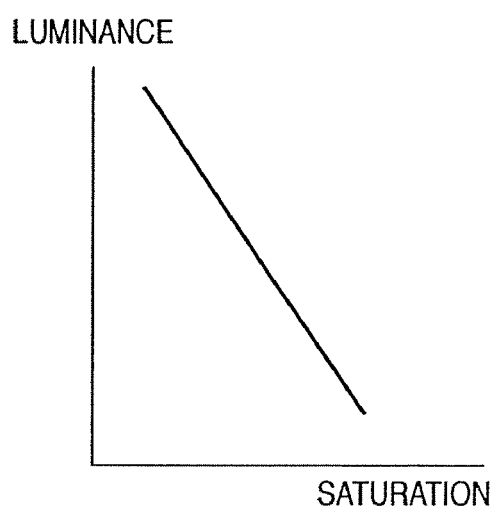
Figure 6B:
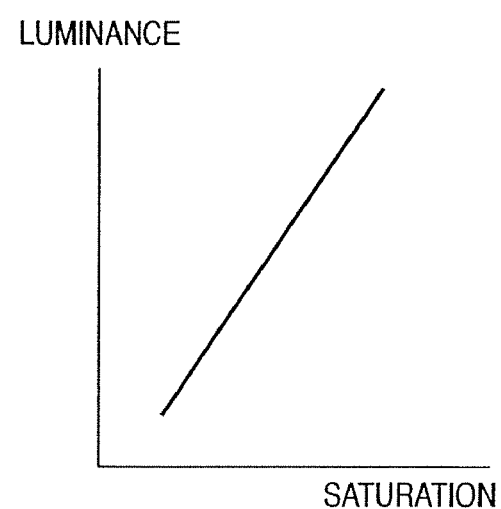

Correction using T and T' is particularly effective for an overexposed or underexposed image. Overexposure occurs since lightness of the overall image is influenced by a bright region such as sky or the like. In this case, in an input device such as a digital camera or the like, color suppression at high lightness levels is made to cut saturation of a high-lightness part. That is, if the color solid axis of an input image is examined on a two-dimensional (2D) plane specified by saturation and lightness axes shown in FIGS. 6A and 6B, a part closest to an achromatic color appears in a high-lightness part in an overexposed image, as shown in FIG. 6A. Contrary to this, in an underexposed image, colors are suppressed at low lightness levels, as shown in FIG. 6B. Therefore, it can be simply checked based on T and T' values if an input image suffers overexposure or underexposure.

Figure 7A:
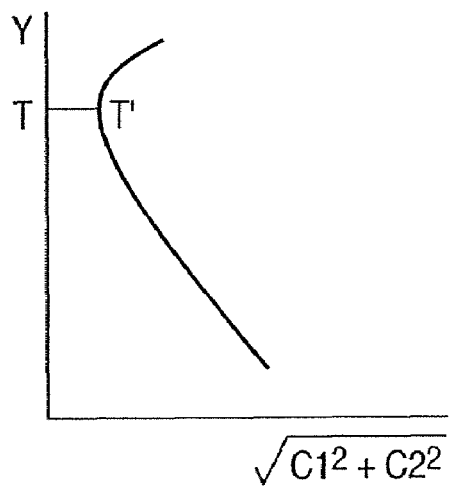
Figure 7B:
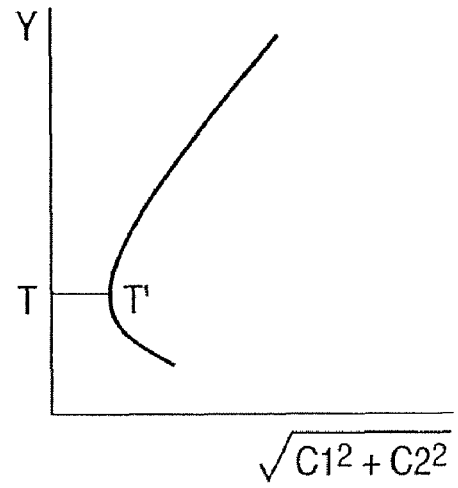

If the lightness axis of a color solid of an actual image is plotted on the lightness-saturation plane, an overexposed image is expressed, as shown in, e.g., FIG. 7A, and an underexposed image is expressed, as shown in, e.g., FIG. 7B. Assuming that an overexposed or underexposed image is obtained when an actual color solid has deviated from an original (ideal) color solid due to some influences of image sensing conditions and input processes (e.g., A/D conversion and the like), the positional relationship between T and T' may have the smallest deviation. Hence, lightness of the overall image is corrected to simply obtain appropriate gray by restoring this deviation.

Saturation can be adjusted very easily. For example, if saturation is to be raised 20%, a process given by:

$$C1''=1.2\times C1'$$

$$C2''=1.2\times C2' \quad (3)$$

can be made.

This is because saturation is defined by $(C1^2+C2^2)$. Note that the degree of saturation adjustment may be determined automatically based on image information or on the basis of a user's instruction.

The image correction process of this embodiment is done on the lightness and color-difference space. Therefore, correction parameters used in the image correction process are 3D lookup tables (3D LUT) generated based on parameters that attain color balance correction, contrast correction, and saturation correction on the lightness and color-difference space.

As described above, according to the first embodiment, the lightness and color-difference distribution is inspected for low-frequency components such as DC components in a DCT image in place of directly inspecting that of an original image. For this reason, the data size to be inspected can be greatly reduced. More specifically, if the MCU configuration is 4:4:4 as in the process in step S209 shown in FIG. 3, the number of MCUs is 1/64 the number of original image data; if the MCU configuration is 4:1:1 as in the process in step S205, the number of MCUs is 1/256 the number of original image data. Hence, by applying the process of the first embodiment, color fog, contrast, saturation, and the like of a photo image can be quickly and satisfactorily corrected.

Second Embodiment

An image process according to the second embodiment of the present invention will be described below. Note that the same reference numerals in the second embodiment denote substantially the same parts as those in the first embodiment, and a detailed description thereof will be omitted.

The first embodiment has exemplified the image correction process that extracts DC components of all MCUs, and extracts the count values of respective lightness levels and average color differences. However, if only DC components are used in a low-resolution image, an image having a 4:1:1 MCU configuration, and the like, a pixel of a characteristic color, and surrounding pixels are averaged, and satisfactory color fog, contrast, and saturation correction parameters fail to be calculated. The second embodiment solves this problem, and implements quick and highly reliable color fog, contrast, and saturation correction processes.

In the second embodiment, the same processes as those in steps S102 to S104 shown in FIG. 2 of the first embodiment are executed. However, a process for acquiring the count value of each lightness level and average color differences in step S102 is different from the first embodiment.

Figure 8:
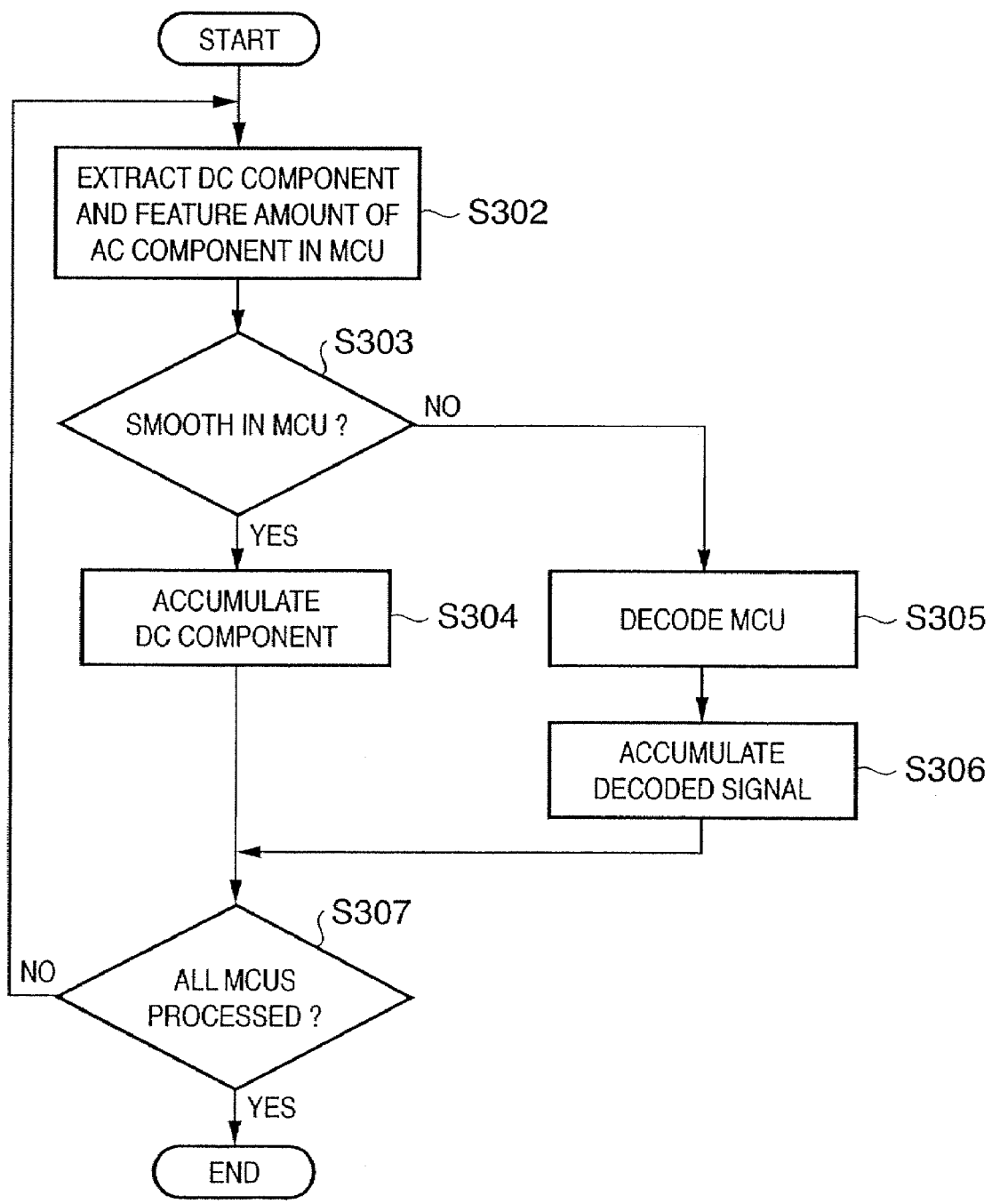
FIG. 8 is a flow chart showing the process of the second embodiment.

FIG. 8 is a flow chart showing details of the process in step S102 in the second embodiment.

In step S302, DC components and a feature amount of AC components of an MCU are acquired. Note that the feature amount is not an actual AC component itself, but is a value which indicates the degree of uniformity of lightness and color-difference information in an MCU of interest. In JPEG, quantized high-frequency components are re-arranged in a predetermined order after DCT, and components at later order positions (in general, higher-frequency component side) assume zero with high probability. After the last significant (nonzero) element of an MCU, a code named EOB (End of Block) is appended so as to reduce the code data size, and coding of that MCU is finished with that element.

Hence, using the feature amounts and their checking conditions shown in Table 1 below, a tendency as to whether lightness and color-difference variations for respective pixels in an MCU are large or smooth as a whole can be recognized. Note that if the checking result is true in Table 1, lightness and color-difference variations are large.

TABLE 1

| Feature Amount | Checking Condition |
| --- | --- |
| Appearance position of EOB | Behind predetermined position? |
| Element at predetermined position/within predetermined range | Predetermined value (e.g., zero)? |
| Sum total of information bit size up to predetermined position/within predetermined range of AC components in MCU | Predetermined size or less? |
| Sum total of quantized values up to predetermined position/within predetermined range of AC components in MCU | Predetermined value or less? |
| Maximum value of quantized values up to predetermined position/within predetermined range of AC components in MCU | Predetermined value or less? |

In step S303, the checking conditions shown in table 1 are examined. As a result, if it is determined that smoothness in the MCU is high, the flow advances to step S304, and DC components are accumulated as in the first embodiment. After that, the flow advances to step S307. On the other hand, if it is determined that smoothness in the MCU is low, the flow advances to step S305 to decode the MCU, and components of all decoded pixels are accumulated in step S306. After that, the flow advances to step S307.

It is checked in step S307 if all MCUs have been processed. If MCUs to be processed still remain, the flow returns to step S302; otherwise, the process ends.

According to the second embodiment, since DC components before decoding an MCU or decoded signal values are accumulated, the count value of the lightness counter and accumulated values of the color difference cumulative buffers must be weighted in correspondence with the MCU configuration to attain uniform count processes in steps S304 and S306.

More specifically, if the MCU configuration is 4:1:1, the lightness counter counts 64 in correspondence with lightness levels Y1, Y2, Y3, and Y4 of DC components, and the corresponding color difference cumulative buffers can accumulate Cb1 and Cr1 respectively multiplied by 64. Likewise, if the MCU configuration is 4:2:2, the counter can count 32, and the buffers can accumulate corresponding values Cb and Cr multiplied with 32; if the MCU configuration is 4:4:4, the counter can count 16, and the buffers can accumulate corresponding values Cb and Cr multiplied with 16. If the MCU configuration is other than these three types, a count value and multiplier suitable for that configuration can be set.

In this manner, the count value of each lightness level and average color differences can be accurately acquired using decoded information for an MCU with low smoothness, and using DC components for an MCU with high smoothness.

Therefore, quick and highly reliable color fog, contrast, and saturation correction processes can be implemented.

Third Embodiment

An image process according to the third embodiment of the present invention will be described below. Note that the same reference numerals in the third embodiment denote substantially the same parts as those in the first embodiment, and a detailed description thereof will be omitted.

The second embodiment has exemplified the method of checking smoothness of each MCU to implement quick and highly reliable color fog, contrast, and saturation correction processes. However, in the third embodiment, a method of achieving both quickness and reliability more easily will be explained.

Figure 9:
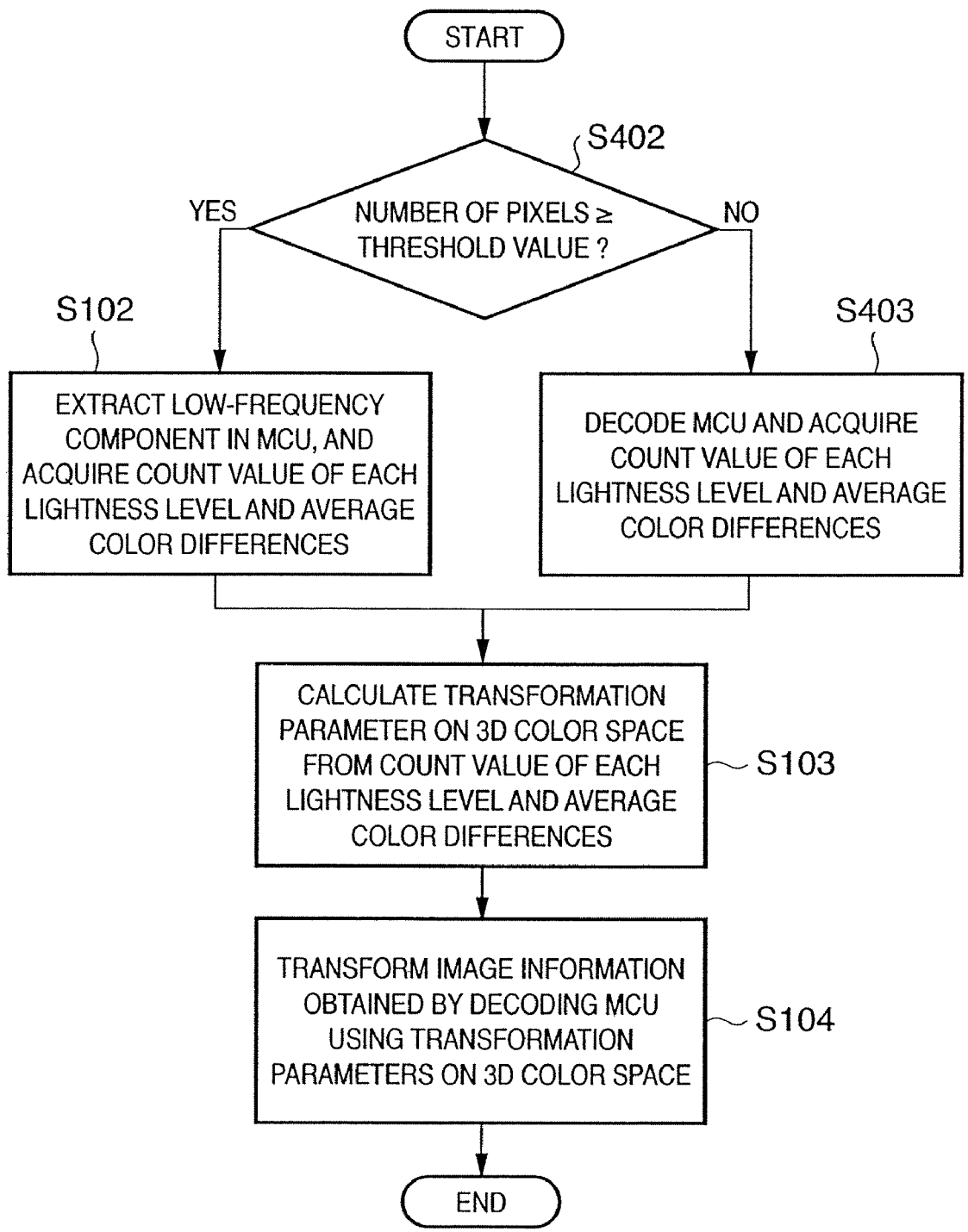
FIG. 9 is a flow chart showing the process of the third embodiment.

FIG. 9 is a flow chart showing the process in the third embodiment.

It is checked in step S402 if the number of pixels of an image is equal to or larger than a predetermined threshold value. If the number of pixels is equal to or larger than the threshold value, low-frequency components are extracted and accumulated by the same method as in the first embodiment (S102). On the other hand, if the number of pixels is smaller than the threshold value, the flow advances to step S403 to decode all MCUs and to accumulate decoded signals.

The method of extracting DC components from MCUs may produce errors compared to a case wherein MCUs are decoded. That is, in an original image with a smaller number of pixels, the weight of information of each pixel is heavier than that in an original image with a larger number of pixels. Hence, if such image is processed by extracting DC components of MCUs, errors become relatively large, and adverse effects such as deterioration of image quality may occur. Also, an original image with a smaller number of pixels can be processed within a short period of time if all MCUs are decoded. Hence, in the third embodiment, an original image with a smaller number of pixels is processed by decoding MCUs, and an original image with a larger number of pixels is processed by extracting DC components from MCUs.

Note that an image with a VGA size (640×480 pixels) or less is preferably processed by decoding MCUs in consideration of balance with adverse effects. Of course, a file size or the like may be used as a criterion in step S402 in place of the number of pixels.

In this way, the count values and average color differences are accurately acquired from an image with a smaller number of pixels (smaller file size) using information obtained by decoding MCUs, and those of an image with a larger number of pixels (larger file size) are quickly acquired using DC components of MCUs. Hence, quick and highly reliable color fog, contrast, and saturation correction processes can be implemented in correspondence with image formats and conditions.

Fourth Embodiment

An image process according to the fourth embodiment of the present invention will be described below. Note that the same reference numerals in the fourth embodiment denote substantially the same parts as those in the first embodiment, and a detailed description thereof will be omitted.

The fourth embodiment will explain a case wherein the numbers X and Y of pixels of an image to be processed in the horizontal and vertical directions are not integer multiples of the numbers x and y of pixels which form each MCU in the horizontal and vertical directions, and only some of pixels in an MCU at the edge of the image are effective pixels and remaining ones are remainder pixels. Since remainder pixels are normally discarded after decoding, a process for such remainder part is not uniquely specified. In general, pixels at the edge are often copied to the remainder part to improve the compression efficiency. In such case, if DC components are extracted, those which are strongly influenced by the edge are extracted, and adverse effects occur in some cases. The fourth embodiment solves such problem, and quickly implements color fog, contrast, and saturation correction processes.

In the fourth embodiment, the same processes as those in steps S102 to S104 shown in FIG. 2 of the first embodiment are executed. However, a process for acquiring the count value of each lightness level and average color differences in step S102 is different from the first embodiment.

Figure 10:
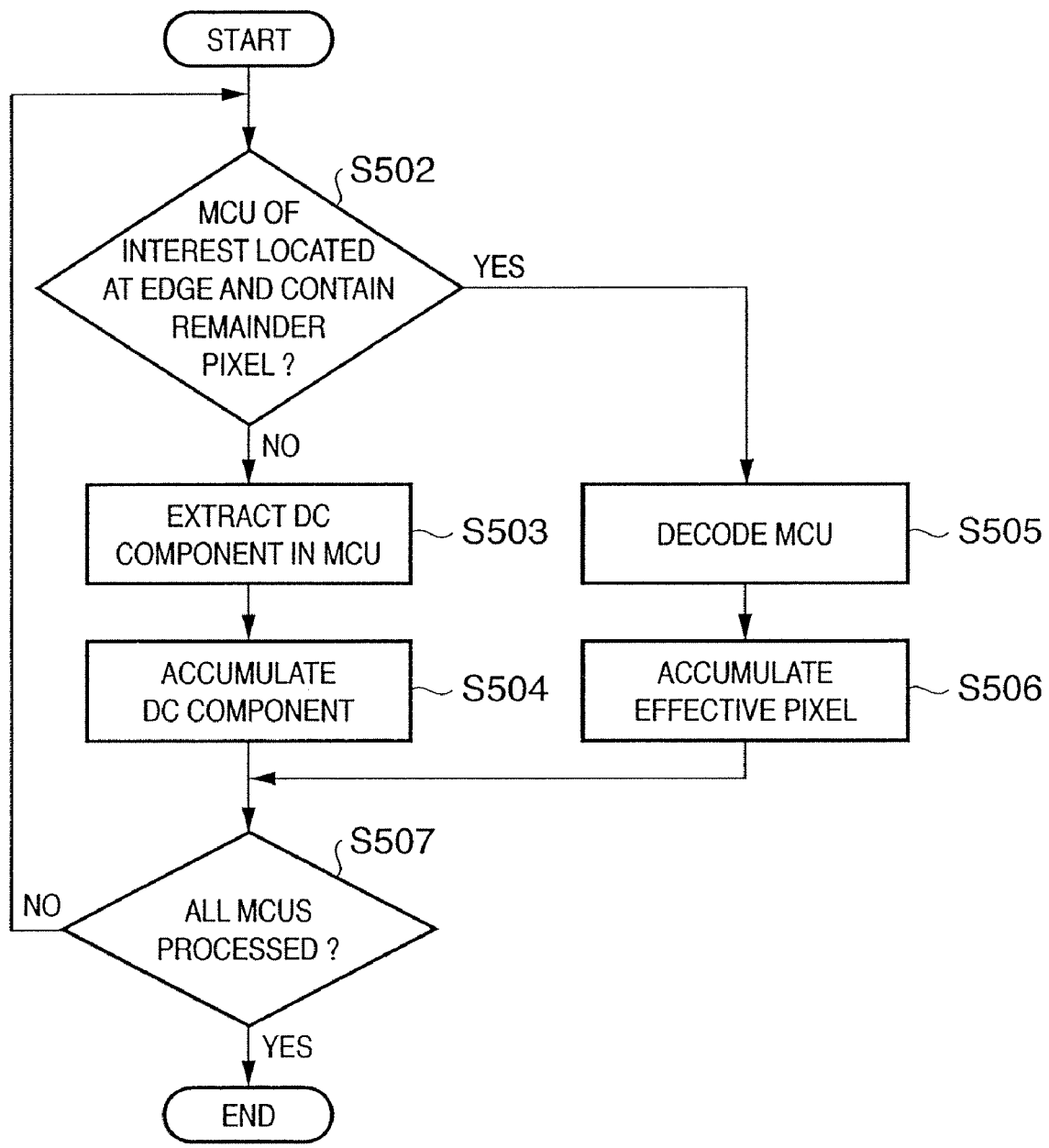
FIG. 10 is a flow chart showing the process of the fourth embodiment.

FIG. 10 is a flow chart showing details of the process in step S102 in the fourth embodiment.

It is checked in step S502 if the MCU to be processed is located at the edge of an image and contains remainder pixels. As a result, if the MCU neither is located at the edge nor contains remainder pixels, DC components are extracted from the MCU and are accumulated in steps S503 and S504 as in the first embodiment. After that, the flow advances to step S507. On the other hand, if the MCU is located at the edge and contains remainder pixels, that MCU is decoded in step S505, and effective ones of the decoded pixels, except for the remainder pixels, are accumulated in step S506. After that, the flow advances to step S507.

It is checked in step S507 if all MCUs have been processed. If MCUs to be processed still remain, the flow returns to step S502; otherwise, the process ends.

In this way, suitable processes are applied to an MCU that contains remainder pixels, and that which does not contain any remainder pixels to execute a quick and accurate accumulation process. Hence, quick and highly reliable color fog, contrast, and saturation correction processes can be implemented in correspondence with the image size and MCU size. In other words, adverse effects owing to remainder pixels at the edge of an image can be avoided while enjoying merits of a high-speed process attained by extracting DC components of MCUs.

Of course, in place of decoding MCUs, the same effects can be obtained by the following method.

(1) Information of an MCU that contains remainder pixels is discarded without accumulation.

(2) Information of an MCU that contains remainder pixels is weighted and accumulated.

Fifth Embodiment

An image process according to the fifth embodiment of the present invention will be described below. Note that the same reference numerals in the fifth embodiment denote substantially the same parts as those in the first embodiment, and a detailed description thereof will be omitted.

The processes that have been explained in the first to fourth embodiments are done based on lightness information extracted upon accumulating lightness and color differences. When the above accumulation process is implemented using DC components, if an MCU contains pixels with an extremely different lightness level, saturation and contrast may be excessively emphasized due to the influence of such pixels. Also, the positions of white and shadow points are averaged if DC components are used, and the feature of original lightness and color differences may be extracted as slightly weakened information. The fifth embodiment this problem, and implements quick and highly reliable color fog, contrast, and saturation correction processes.

In the fifth embodiment, the same processes as those in steps S102 to S104 shown in FIG. 2 of the first embodiment are executed. However, a process for acquiring the count value of each lightness level and average color differences in step S102 is different from the first embodiment.

Figure 11:
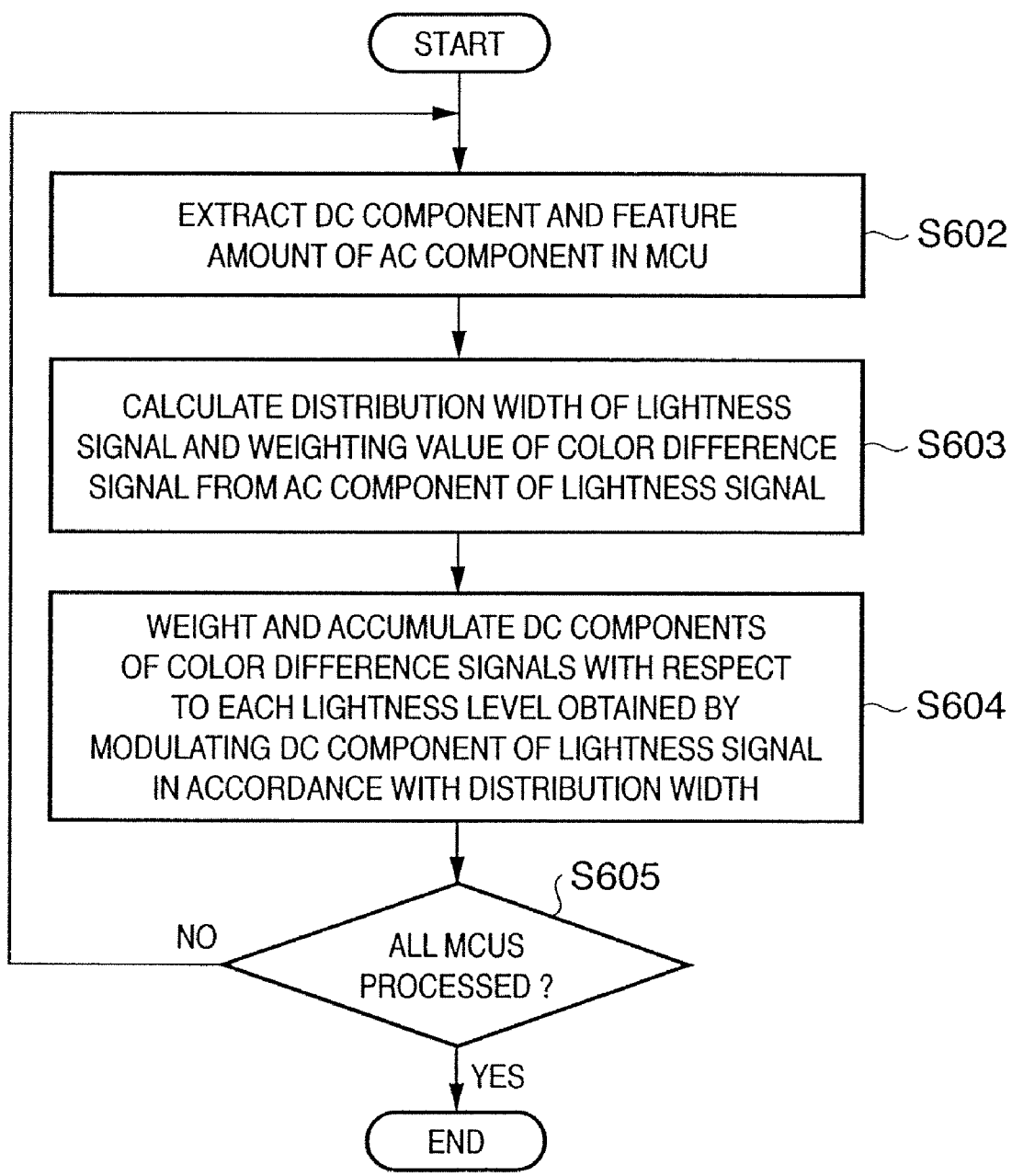
FIG. 11 is a flow chart showing the process of the fifth embodiment.

FIG. 11 is a flow chart showing details of the process in step S102 in the fifth embodiment.

In step S602, DC components and a feature amount of AC components in an MCU are extracted. This feature amount is an index that represents the smoothness of lightness/color differences in the MCU as in the second embodiment.

In step S603, a modulation width of lightness information and a weighting value of color difference information are calculated in accordance with the extracted feature amount. In step S604, the lightness counter and cumulative buffer 200 undergo accumulation in accordance with the modulation width and weighting value. That is, color difference information weighted by the weighting value is accumulated within a range obtained by modulating lightness by the modulation width. Details of this process will be explained later with reference to FIGS. 12A to 12C.

It is checked in step S605 if all MCUs have been processed. If MCUs to be processed still remain, the flow returns to step S602; otherwise, the process ends.

Figure 12A:
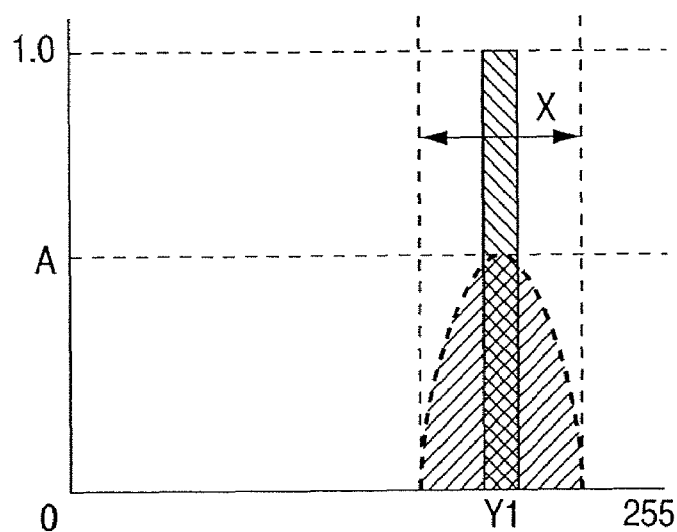
FIGS. 12A to 12C are views for explaining accumulation processes according to classes of feature amounts.
Figure 12B:
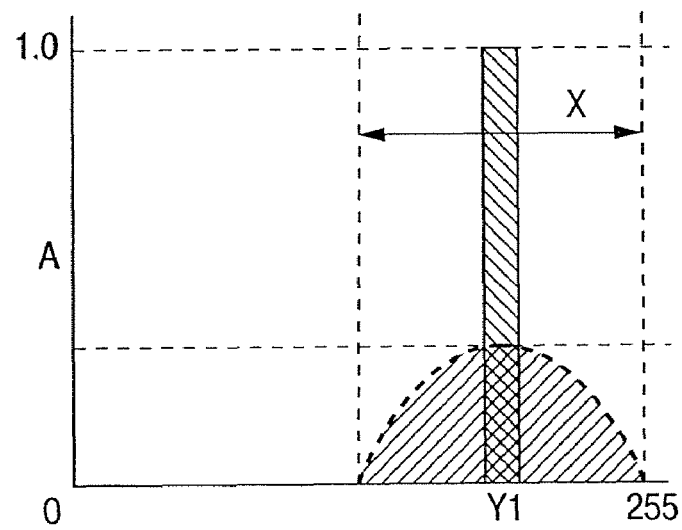
Figure 12C:
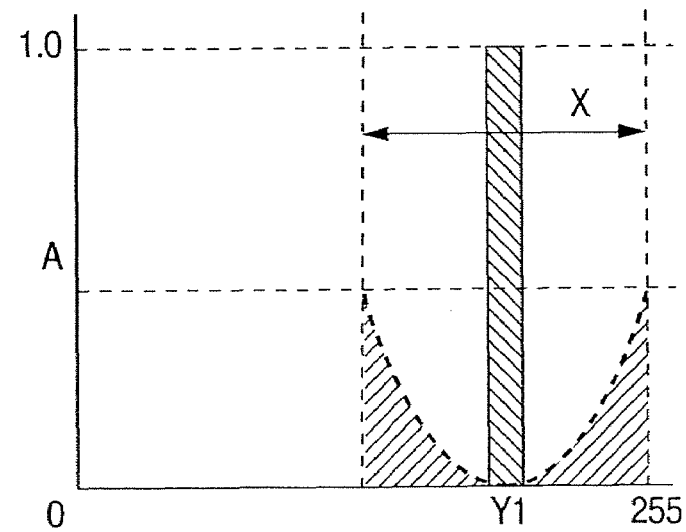

FIGS. 12A to 12C are views for explaining accumulation which is done while categorizing the feature amount into "high smoothness", "low smoothness", and "low smoothness & very large AC component".

FIG. 12A shows a case of "high smoothness" in an MCU, FIG. 12B shows a case of "low smoothness" in an MCU, and FIG. 12C shows a case of "low smoothness & very large AC component" in an MCU. In any of these cases, color difference information, which is weighted by a weight indicated by the broken curve is accumulated in the cumulative buffer 200 corresponding to the lightness counter within the range of a modulation width X with respect to a DC extracted value Y1 of lightness of an MCU.

As shown in FIGS. 12A to 12C, the modulation width X is smaller with increasing smoothness, and is broader with decreasing smoothness. Peak value A of a weight which forms a parabolic curve within the range of the modulation width X is larger with increasing smoothness, and is smaller with decreasing smoothness. However, if the AC component signal is very large, a weighting curve has negative characteristics. Note that an area (indicated by hatching in FIGS. 12A to 12C) specified by the weighting curve and Y-axis (abscissa) within the range of the modulation width X is constant in all the cases.

In this way, since accumulation is done within the range corresponding to the smoothness of an MCU, a cumulative value that reflects the characteristics of each MCU can be obtained, and quick and highly reliable color fog, contrast, and saturation correction processes can be implemented.

In the above embodiment, MCUs are categorized into three classes in accordance with the features of AC components, and lightness and color differences are accumulated in accordance with the features. However, the gist of this embodiment lies in suitable accumulation according to the smoothness in an MCU, and the number of classes is not particularly limited.

Sixth Embodiment

An image process according to the sixth embodiment of the present invention will be described below. Note that the same reference numerals in the sixth embodiment denote substantially the same parts as those in the first embodiment, and a detailed description thereof will be omitted.

Figure 13:
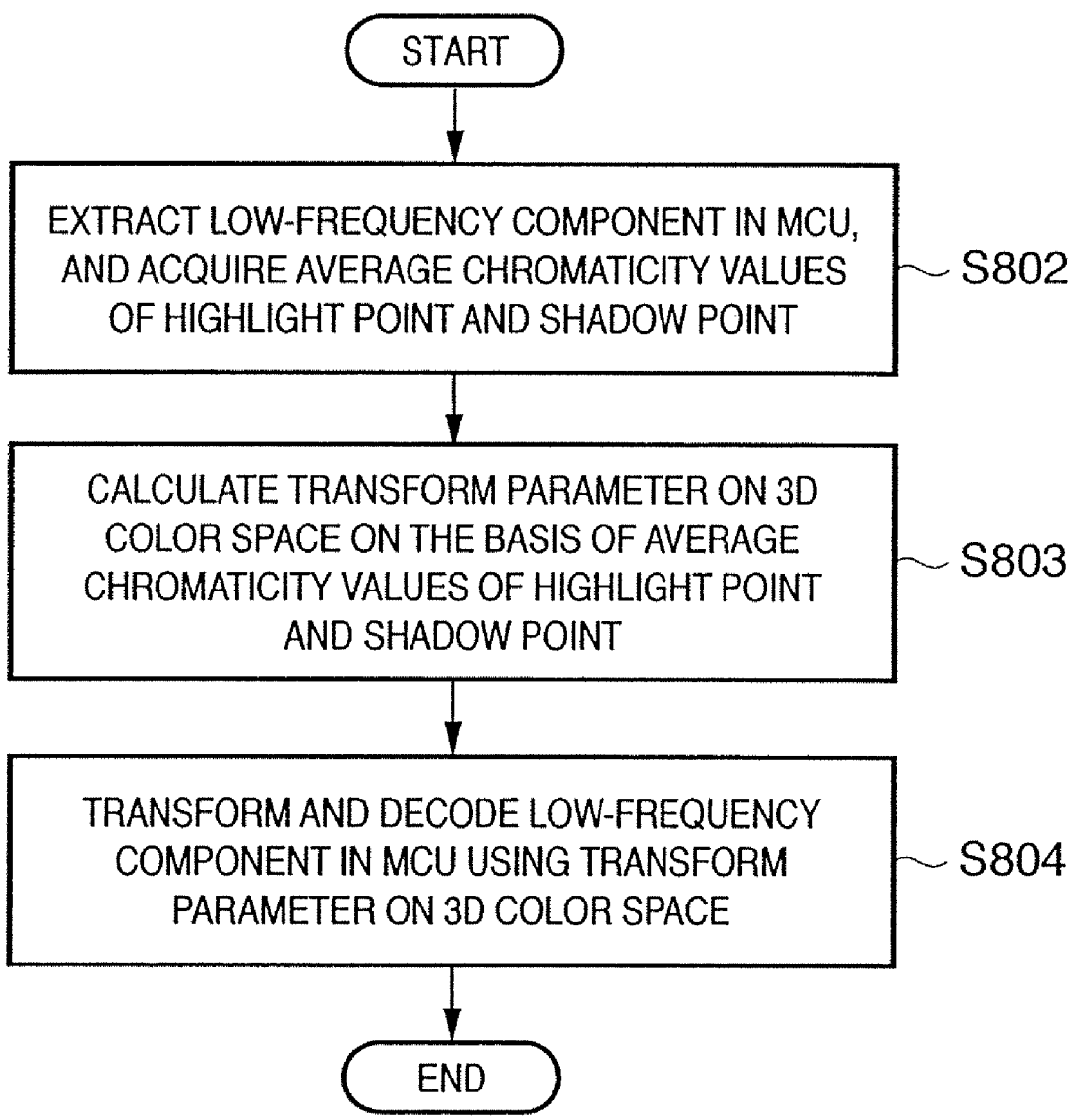
FIG. 13 is a flow chart showing the process of the sixth embodiment.

FIG. 13 is a flow chart showing the process of the sixth embodiment.

In step S802, an encoded image is analyzed. The DC components of lightness and color-difference signals are extracted from MCUs without computing the IDCTs of all MCUs of an image to be processed. By accumulating/counting these lightness and color-difference signals, the count values of respective lightness levels and average color differences are acquired, and highlight point HL and shadow point SD are obtained by the same method as in the first embodiment.

In step S803, transformation parameters of lightness and color-difference signals on the 3D color space are calculated on the basis of highlight point HL and shadow point SD acquired in step S802 by the same method as in the first embodiment.

In step S804, the DC components of lightness and color-difference signals before decoding MCUs are corrected using the transformation parameters calculated in step S803, and the IDCTs of the corrected DC components and AC components of lightness and color-difference signals are then computed. In this way, the number of times of transformation using 3D LUTs for color fog, contrast, and saturation correction processes can be greatly reduced, and the correction process speech can be improved.

Seventh Embodiment

In the seventh embodiment, an ink-jet printer with photo image quality, which comprises a direct print protocol (DPP), to which the present invention is applied, will be explained. Note that the same reference numerals denote substantially the same parts as those in the first to sixth embodiments, and a detailed description thereof will be omitted.

[Outline]

Figure 14:
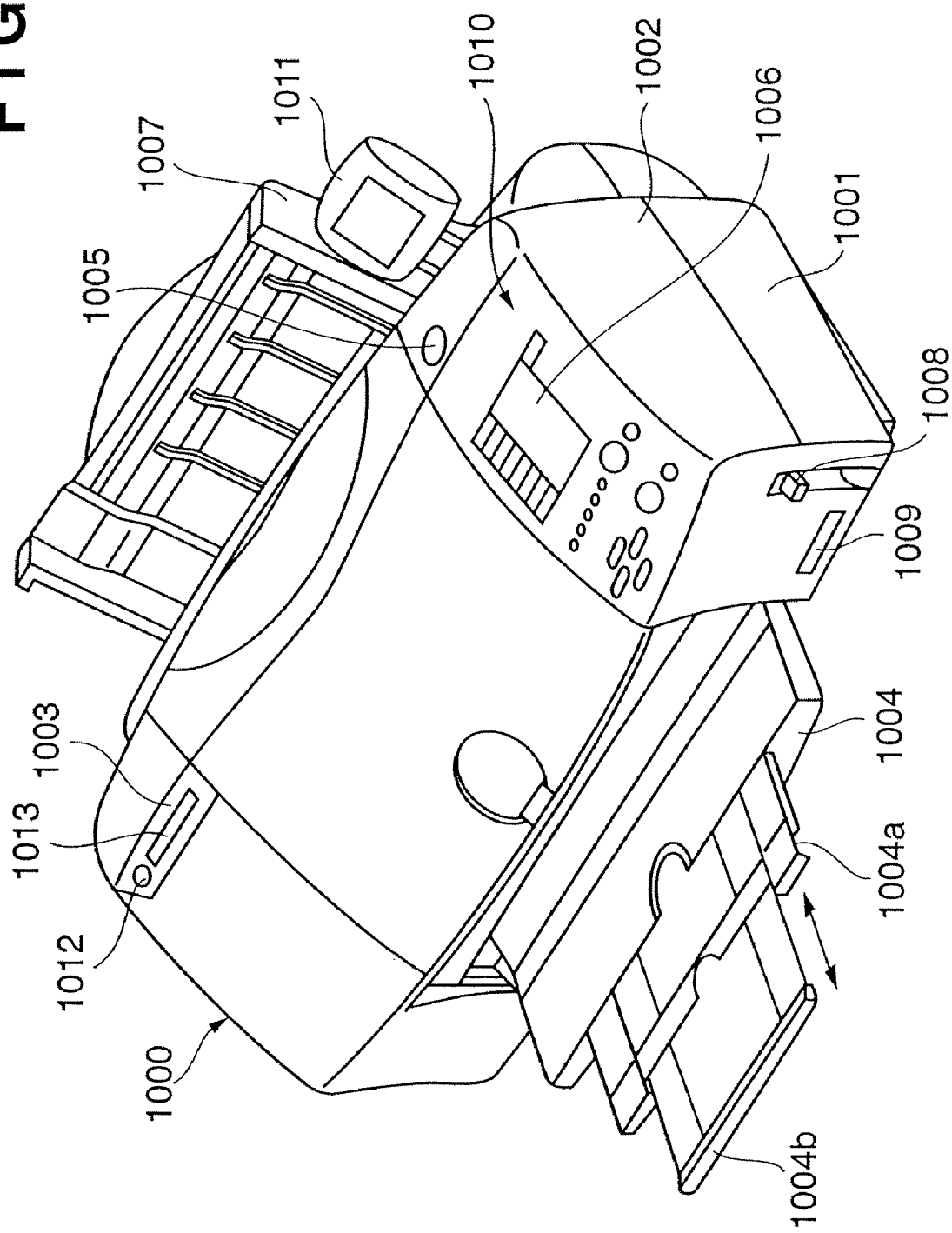
FIG. 14 is a schematic perspective view of a printer.

FIG. 14 is a schematic perspective view of a printer 1000 of the seventh embodiment.

A printer 1000 has a normal printer function of printing image data received from a host computer, and a direct print function of printing image data read from a storage medium such as a memory card or the like or printing image data received from an image input device such as a digital camera or the like.

Referring to FIG. 14, a main body which forms an outer shell of the printer 1000 comprises exterior members, i.e., a lower case 1001, upper case 1002, access cover 1003, and exhaust tray 1004. The lower case 1001 forms roughly the lower half portion of the main body, and the upper case 1002 forms roughly the upper half portion of the main body. By combining these cases, a hollow structure which has a storage space that stores a mechanism to be described later is formed. Openings are respectively formed on the upper and front surfaces of the main body.

One end portion of the exhaust tray 1004 is rotatably held by the lower case 1001, and rotation of the tray 1004 opens/closes the opening formed on the front surface of the lower case 1001. For this reason, upon making the printer 1000 execute a print process, the exhaust tray 1004 is rotated toward the front surface side to open the opening, so that print sheets can be ejected from the opening. The ejected print sheets are stacked on the exhaust trays 1004 in turn. The exhaust tray 1004 stores two auxiliary trays 1004a and 1004b, and when these auxiliary trays are pulled out as needed, the loading area of print sheets can be enlarged/reduced in three steps.

One end portion of the access cover 1003 is rotatably held by the upper case 1002, and rotation of the cover 1003 opens/closes the opening formed on the upper surface of the main body. When the access cover 1003 is opened, a print-head cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of that lever using a microswitch or the like, the open/close state of the access cover 1003 is detected.

A power key 1005 is arranged on the upper surface of the upper case 1003. A control panel 1010 which comprises a liquid crystal display 1006, various key switches, and the like is provided on the right side of the upper case 1002. Details of the control panel 1010 will be described later.

An automatic feeder 1007 automatically conveys a print sheet into the main body. A paper gap select lever 1008 is used to adjust the gap between the print head and print sheet. A card slot 1009 can receive a PC card complying with, e.g., the PCMCIA (Personal Computer Memory Card International Association) standard. An adapter which can receive a memory card or the like is inserted into the card slot 1009, and image data stored in the memory card can be loaded and printed via this adapter. As the memory card, for example, a compact flash memory, smart media, memory stick, and the like may be used. Also, a PC card that incorporates a hard disk may be used.

A viewer (liquid crystal display unit) 1011 is detachable from the main body, and is used when an image, index image, and the like are displayed for respective frames (e.g., when the user searches images stored in the memory card for an image to be printed). A connector 1012 is connected to a digital camera or the like (to be described later). A connector 1013 is a USB bus connector used to connect a personal computer or the like.

[Print Head]

FIG. 15 is a schematic perspective view showing an example of the structure of the print head of the printer 1000.

A print head cartridge 1200 in this embodiment has a plurality of ink tanks 1300 that store inks, and a print head 1301 which ejects inks supplied from the ink tanks 1300 from nozzles in accordance with print information, as shown in FIG. 15. The print head 1301 is of a so-called cartridge type, which is detachably mounted on a carriage (not shown). Upon printing, the print head cartridge 1200 is reciprocally scanned along a carriage shaft, thus printing a color image on a print sheet. In the print head cartridge 1301 shown in FIG. 15, independent ink tanks 1300 for, e.g., black (K), light cyan (LC), light magenta (LM), cyan (C), magenta (M), and yellow (Y) are prepared to attain a photo-quality color print process, and are detachable from the print head 1301.

Note that an example that uses the aforementioned six color inks will be described below. However, the present invention is not limited to such specific number of inks. For example, the present invention may be applied to a printer which prints using four inks, i.e., black, cyan, magenta, and yellow. In this case, independent, four color ink tanks may be detachable from the print head 1301.

[Control Panel]

Figure 16:
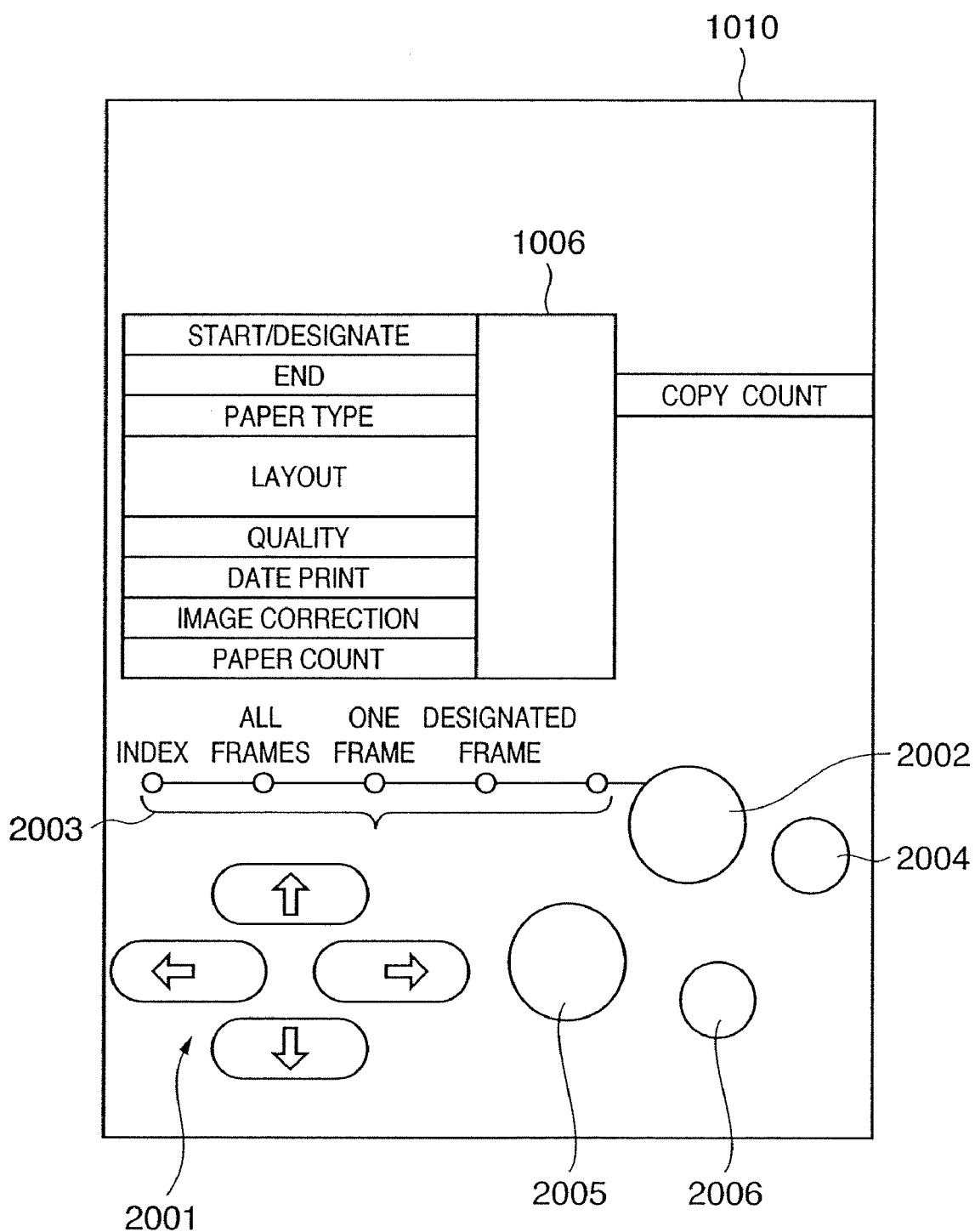
FIG. 16 is a schematic view of a control panel.

FIG. 16 is a schematic view of the control panel 1010.

Referring to FIG. 16, the liquid crystal display unit 1006 displays the following menu items and the like used to set data associated with items printed on the right and left sides of the unit 1006. These items can be selected or designated using cursor keys 2001.

Start/designate: first photo number or designated frame number used to specify the range of image data (photos) to be printed End: last photo number used to specify the range of image data (photos) to be printed Copy count: the number of copies to be printed Paper type: the type of print paper (print sheet) used in a print process Layout: the setup of the number of images (photos) printed per print sheet Quality: designate print quality Date print: designate if a photographing date is printed Image correction: designate if an image (photo) is printed after correction Print sheet count: displays the number of print sheets required for the print process Every time a mode key 2002 is pressed, the type of print (index print, all-frame print, one-frame print, and the like) is switched, and a corresponding LED 2003 is turned on in accordance with the selected type of print. A maintenance key 2004 is used to do maintenance of the printer 1000 (e.g., cleaning of the print head 1301, and the like). A print start key 2005 is pressed when the start of a print process is instructed or when the maintenance setup is settled. A print cancel key 2006 is pressed when a print process or maintenance is canceled.

[Control Arrangement]

Figure 17:
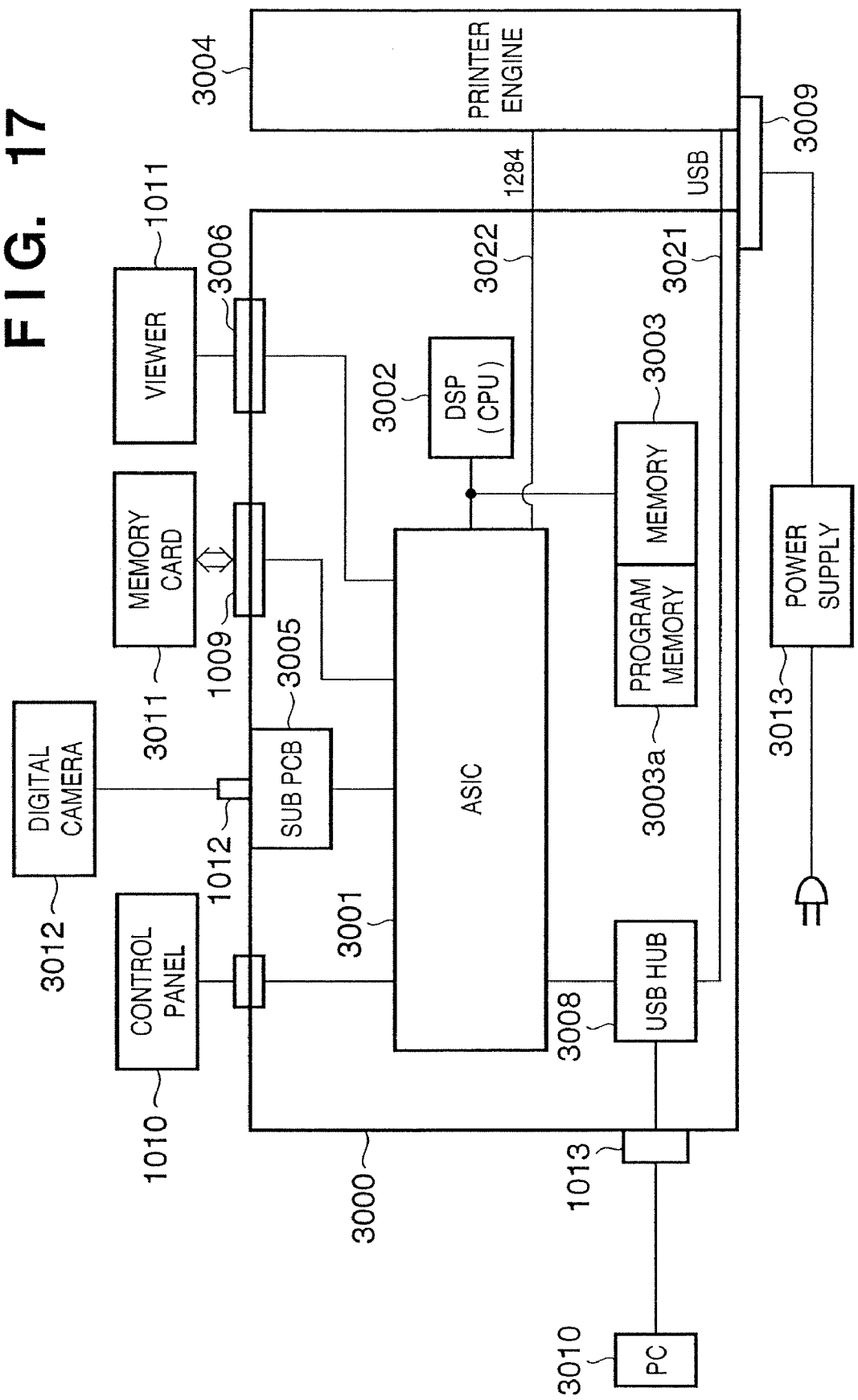
FIG. 17 is a block diagram showing the arrangement of a principal part associated with printer control.

FIG. 17 is a block diagram showing the arrangement of principal part associated with control of the printer 1000.

A DSP (digital signal processor) 3002 is DSP-C6211 available from Texas Instruments Incorporated, which includes a CPU and executes various kinds of control to be described later, and image processes such as conversion from a luminance signal (RGB) into a density signal (CMYK), scaling, gamma conversion, error diffusion, and the like. A memory 3003 has a program memory 3003a which stores a control program to be executed by the CPU of the DSP 3002. The memory 3003 serves as a work area of the DSP 3002, and stores programs and various data such as image data and the like. Note that the storage capacity of the memory 3003 is often as small as several Mbytes due to cost limitations and the like in a normal photo-direct printer. Also, since the memory 3003 includes the program memory 3003a and also an area required to store interface-related data, a storage capacity that can be actually used for the purpose of image processes is further reduced.

A printer engine 3004 is that for an ink-jet printer which prints a color image using a plurality of color inks. A digital camera 3012 is connected to a USB bus connector 3005, and the viewer 1011 is connected to a connector 3006. When the printer 1000 executes a print process based on image data input from the PC 3010, a USB hub 3008 allows data received from a PC 3010 to pass through it, and supplies the data to the printer engine 3004 via a USB bus 3021. In this way, the PC 3010 connected to the printer 1000 can execute a print process by directly exchanging data, signals, and the like with the printer engine 3004. That is, the printer 1000 serves as a normal printer. A power connector 3009 inputs a DC voltage which is converted from commercial AC power by a power supply 3013.

Note that a communication is made between a controller 3000 and the printer engine 3004 via the USB bus 3021 or an IEEE1284 interface 3022.

Figure 18:
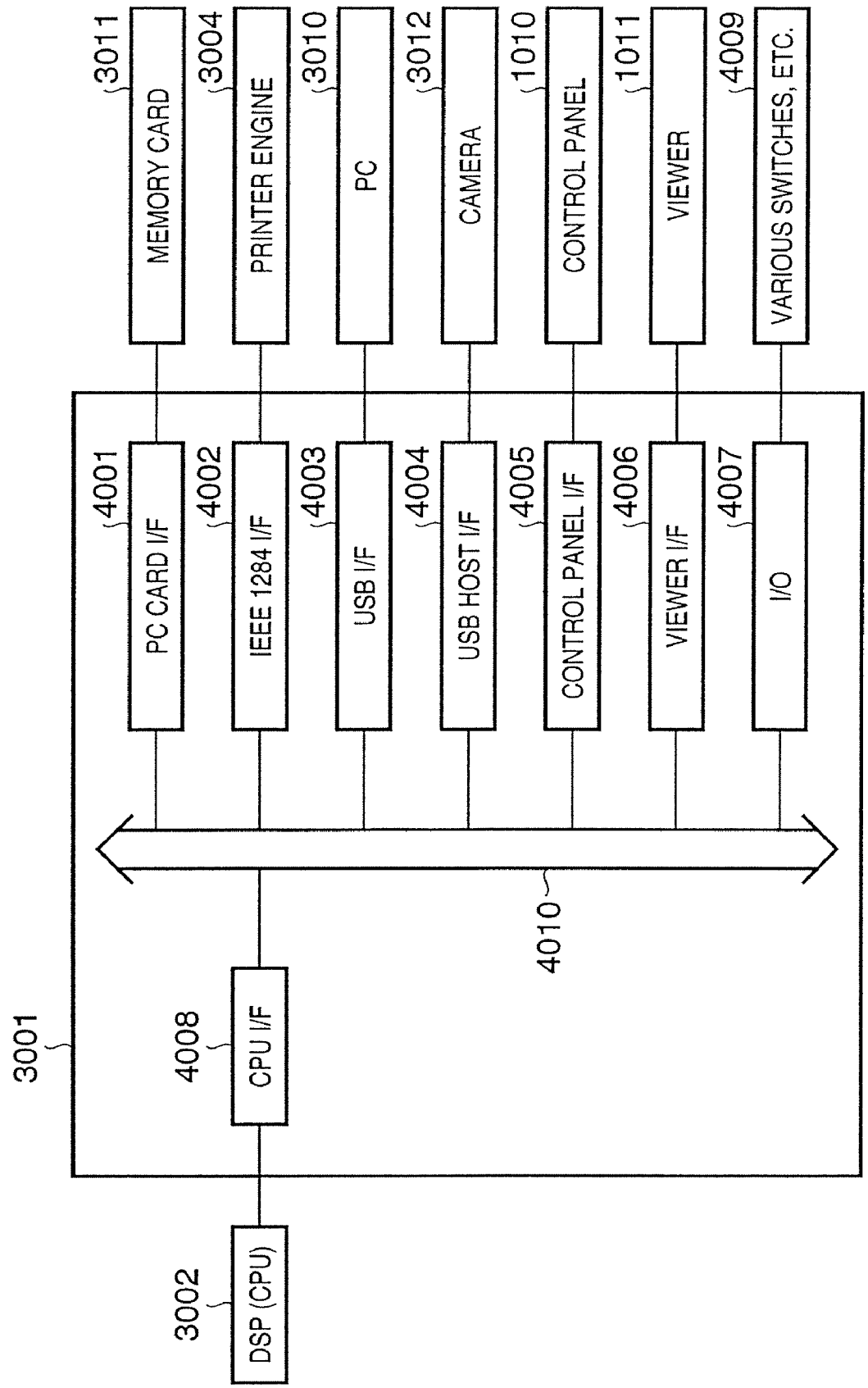
FIG. 18 is a block diagram showing an example of the arrangement of ASIC.

FIG. 18 is a block diagram showing the arrangement of an ASIC (dedicated custom LSI) 3001.

A PC card interface (I/F) 4001 is used to read image data stored in a memory card 3011 inserted into the card slot 1009, and to write data in the memory card 3011. An IEEE 1284 interface 4002 is used to communicate with the printer engine 3004, when image data obtained from the digital camera 3012 or memory card 3011 is to be printed. A USB interface 4003 is used to communicate with, e.g., the PC 3010 or the like. A USB host interface 4004 is used to communicate with, e.g., the digital camera 3012 or the like. A control panel interface 4005 is used to receive various operation signals from the control panel 1010, and to output display data to the display unit 1006. A viewer interface 4006 is used to output image data to the viewer 1011. An I/O 4007 is an interface which is used to acquire status data of various switches, and to turn on/off LEDs 4009. A CPU interface 4008 is used to communicate with the DSP 3002. These interfaces are interconnected via an internal bus (ASIC bus) 4010.

[Image Process]

Figure 19:
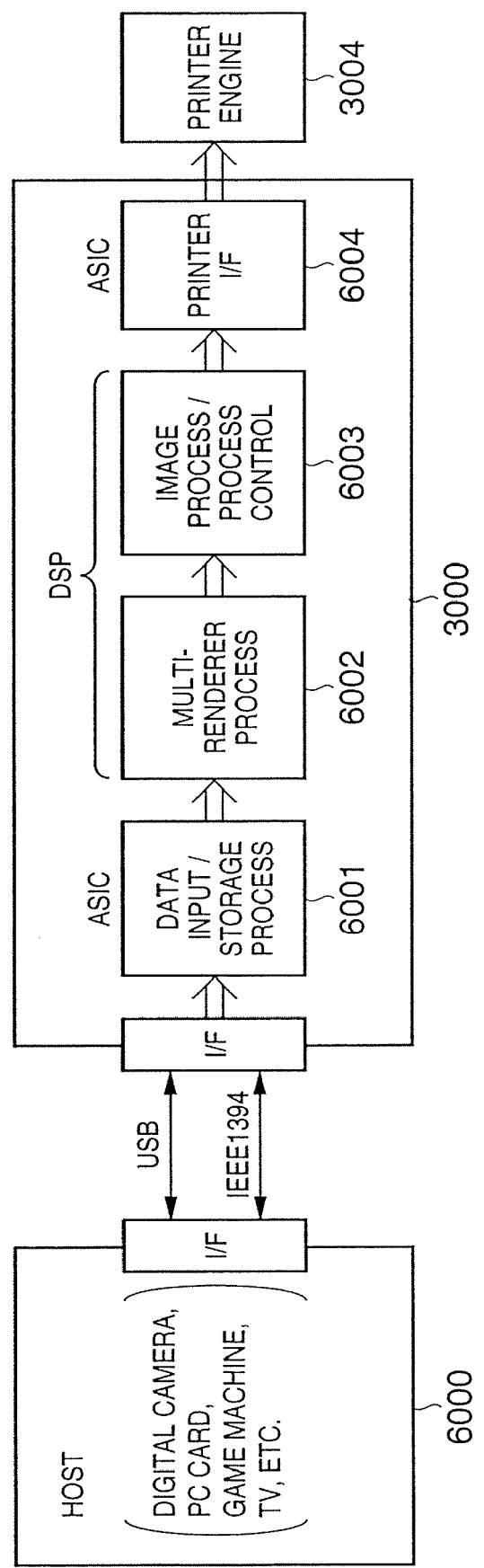
FIG. 19 is a block diagram showing the functional arrangement associated with a printer interface and image process.

FIG. 19 is a block diagram showing the functional arrangement associated with the interface and image process of the printer 1000.

A host 6000 corresponds to a host machine, i.e., a data source when viewed from the printer 1000. The host 6000 includes the PC 3010 as a host computer, digital camera 3012, and PC card 3011, which have been described above, a game machine, television device, and the like (which are not shown). The host 6000 and printer 1000 are connected via an interface such as IEEE1284, IEEE1394, or the like, or may be connected via a wireless interface such as Bluetooth or the like.

The functions of the controller 3000 include a data input/storage process 6001 implemented by the ASIC 3001, a printer interface 6004 for outputting print data to the printer engine 3004, and a multi-renderer process 6002 and image process/process control 6003, which are implemented by the DSP 3002.

Image data read from the host 6000 is stored in the memory 3003 by the data input/storage process 6001. Image data stored in the memory 3003 is converted into data, which can be processed by the image process/process control 6003, by the multi-renderer process 6002. The image process/process control 6003 executes size conversion, a color process, and quantization, which are normally executed by a printer driver of a host computer. This color process includes general color conversion processes such as gamut mapping as RGB-R'G'B' conversion that corrects the color space of an original image to that of a printer, luminance-density conversion for converting R'G'B into CMYK as color agent components of a printer, a UCR & masking process, output gamma correction, and the like, and also an image correction process for appropriately expressing the colors of an image sensed by the digital camera 3012, and the like.

The image data that has undergone the image process/process control 6003 is sent to the printer engine 3004 via the printer I/F 6004. The printer engine 3004 executes various kinds of control such as motor control, data transfer to the printhead 1301, and the like by a known method (although its detailed description will be omitted), thus printing an image on a print sheet.

As has been described briefly, the printer 1000 is characterized by executing processes using the DSP. In general, a DSP excels in product sum operations. A high-function type DSP that incorporates many arithmetic elements like the DSP 3002 of this embodiment is advantageous in parallel processes such as product sum operations and the like. Therefore, the DSP 3002 is suitable for arithmetic operations such as color processes, quantization, and the like, which may impose heavy loads on a normal processor in a direct print mode.

Furthermore, since use of the DSP 3002 is extremely suited to the purpose for computing the frequency transforms such as DCTs, IDCTs, and the like, and a software process can be flexibly changed and adjusted, a special decoding process described in the first to sixth embodiments (to be referred to as a "high-speed JPEG decoding process" hereinafter), which is different from a general JPEG decoding process, can be easily implemented. If the high-speed JPEG decoding process is implemented by a batch process of a normal processor, DCT processes take considerable time, and printer performance drops considerably upon executing a direct print process. If all functions are implemented by an ASIC, the circuit scale required to implement the high-speed JPEG decoding process becomes large and complicated. Of course, the circuit scale increases if a high-speed process is implemented without using any high-speed JPEG decoding process.

Since the high-speed JPEG decoding process is implemented using the DSP, its effect can be remarkably improved.

Note that the first to seventh embodiments described above need not be independently applied to an image processing apparatus such as a printer or the like, but may be applied to an image processing apparatus in combination, thus implementing a more preferable image process that combines the merits of the above embodiments.

Also, various arithmetic processes in color balance correction, contrast correction, saturation correction, and the like which have been explained in the first to sixth embodiments can be implemented by supplying software to a CPU of a computer or by an electronic circuit (hardware) that combines multipliers and adders.

In the above embodiments, image data that has undergone orthogonal transformation using 8×8 pixels as one block has been exemplified. However, arbitrary block sizes such as 4×4 pixels, 16×16 pixels, and the like may be used, and a value other than the power of 2 such as 10×10 pixels or the like may be used.

As described above, according to the above embodiments, an image process is done by inspecting the lightness and color-difference distribution for low-frequency components in frequency data. That is, an image need not be decoded for pre-inspection of the lightness/color difference distribution, and the data size to be inspected can be greatly reduced. Therefore, when an image compressed by, e.g., JPEG is to undergo color fog, contrast, and saturation correction processes, the processing time and load required to determine the 3D transform amount can be greatly reduced.

Also, various problems which are expected upon executing the image process based on low-frequency components can be solved using the number of pixels, the feature amount of AC components, and the like, and quick and highly reliable color fog, contrast, and saturation correction processes can be implemented.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   an acquisition section, arranged to acquire lightness and color-difference information of halftone image data based on low-frequency components of frequency data obtained by transforming the halftone image data into spatial frequency components;

a setting section, arranged to set a lightness and color-difference transform amount of the halftone image data based on the acquired lightness and color-difference information; and an image processor, arranged to perform color balance correction on the halftone image data using the set lightness and color-difference transform amount, wherein said image processor further performs contrast correction or chroma correction on the halftone image data using the set lightness and color-difference transform amount.

2. An image processing apparatus comprising:

a decider, arranged to decide whether or not a number of pixels of halftone image data is more than or equal to a predetermined number;

an extractor, arranged to extract low-frequency components of frequency data obtained by transforming the halftone image data into spatial frequency components when the number of pixels is more than or equal to the predetermined number;

an acquisition section, arranged to acquire lightness and color-difference information of the halftone image data from the low-frequency components when the number of pixels is more than or equal to the predetermined number, and to acquire the lightness and color-difference information of the halftone image data from image data obtained by inverse-transforming the frequency data when the number of pixels is less than the predetermined number; and a setting section, arranged to set a lightness and color-difference transform amount of the halftone image data based on the acquired lightness and color-difference information.

3. The apparatus according to claim 2, wherein said extractor extracts the low-frequency components in a unit of the frequency data.

4. The apparatus according to claim 2, further comprising an image processor arranged to perform color balance correction, contrast correction, or chroma correction on the halftone image data using the set lightness and color-difference transform amount.

5. An image processing method comprising the steps of:

deciding whether or not a number of pixels of halftone image data is more than or equal to a predetermined number;

extracting low-frequency components of frequency data obtained by transforming the halftone image data into spatial frequency components when the number of pixels is more than or equal to the predetermined number;

acquiring lightness and color-difference information of the halftone image data from the low-frequency components when the number of pixels is more than or equal to the predetermined number;

acquiring the lightness and color-difference information of the halftone image data from image data obtained by inverse-transforming the frequency data when the number of pixels is less than the predetermined number; and setting a lightness and color-difference transform amount of the halftone image data based on the acquired lightness and color-difference information.

* * * * *